United States Patent [19]
Kutalowski

[11] Patent Number: 6,123,538
[45] Date of Patent: Sep. 26, 2000

[54] COOLING DEVICE ATTACHED TO AN INDEX MACHINE

[75] Inventor: Jerzy Kutalowski, Brampton, Canada

[73] Assignee: Husky Injection Molding Systems Ltd., Canada

[21] Appl. No.: 09/215,819

[22] Filed: Dec. 18, 1998

Related U.S. Application Data

[63] Continuation-in-part of application No. 09/167,699, Oct. 7, 1998, Pat. No. 6,059,557.

[51] Int. Cl.⁷ ................................................ B29C 45/72
[52] U.S. Cl. ............... 425/552; 264/328.8; 264/328.16; 425/572; 425/576
[58] Field of Search ..................... 425/547, 552, 425/572, 576; 264/328.8, 328.14, 328.16

[56] References Cited

U.S. PATENT DOCUMENTS

| Re. 33,237 | 6/1990 | Delfer, III . | |
|---|---|---|---|
| 4,729,732 | 3/1988 | Schad et al. . | |
| 5,447,426 | 9/1995 | Gessner | 425/526 |
| 5,728,409 | 3/1998 | Schad et al. . | |
| 5,837,301 | 11/1998 | Arnott et al. | 425/574 |

Primary Examiner—Tim Heitbrink
Attorney, Agent, or Firm—Bachman & LaPointe, P.C.

[57] ABSTRACT

The present invention relates to a device for cooling and removing molded parts, which device has particular utility with an index molding machine having a rotary turret block with at least two movable mold halves thereon. The device includes a carrier plate having a plurality of tubes for receiving and cooling at least one molded part mounted to a first surface thereof and a plurality of blowing tubes for applying a cooling fluid to external surfaces of at least one molded part, while the at least one molded part is positioned on one of the faces of a rotary turret block, mounted to a second surface of the carrier plate. The device further has an actuation system for moving the carrier plate between a first position where the receiving and cooling tubes are aligned with the at least one molded part and a second position where the at least one molded part is being cooled within the receiving and cooling tubes and the cooling fluid applying blowing tubes are positioned adjacent a respective turret block face. The actuation system comprises a cam plate having a guide track therein, at least one cam follower connected to the carrier plate, and a linear drive system for causing the cam follower to move along the guide track and thereby cause movement of the carrier plate from the first position to the second position and vice versa.

37 Claims, 20 Drawing Sheets

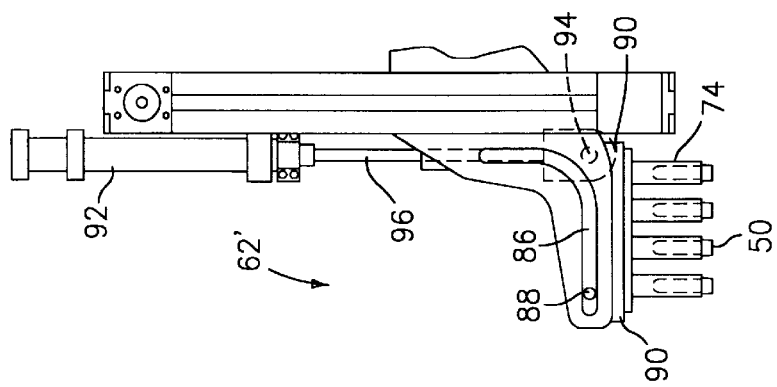
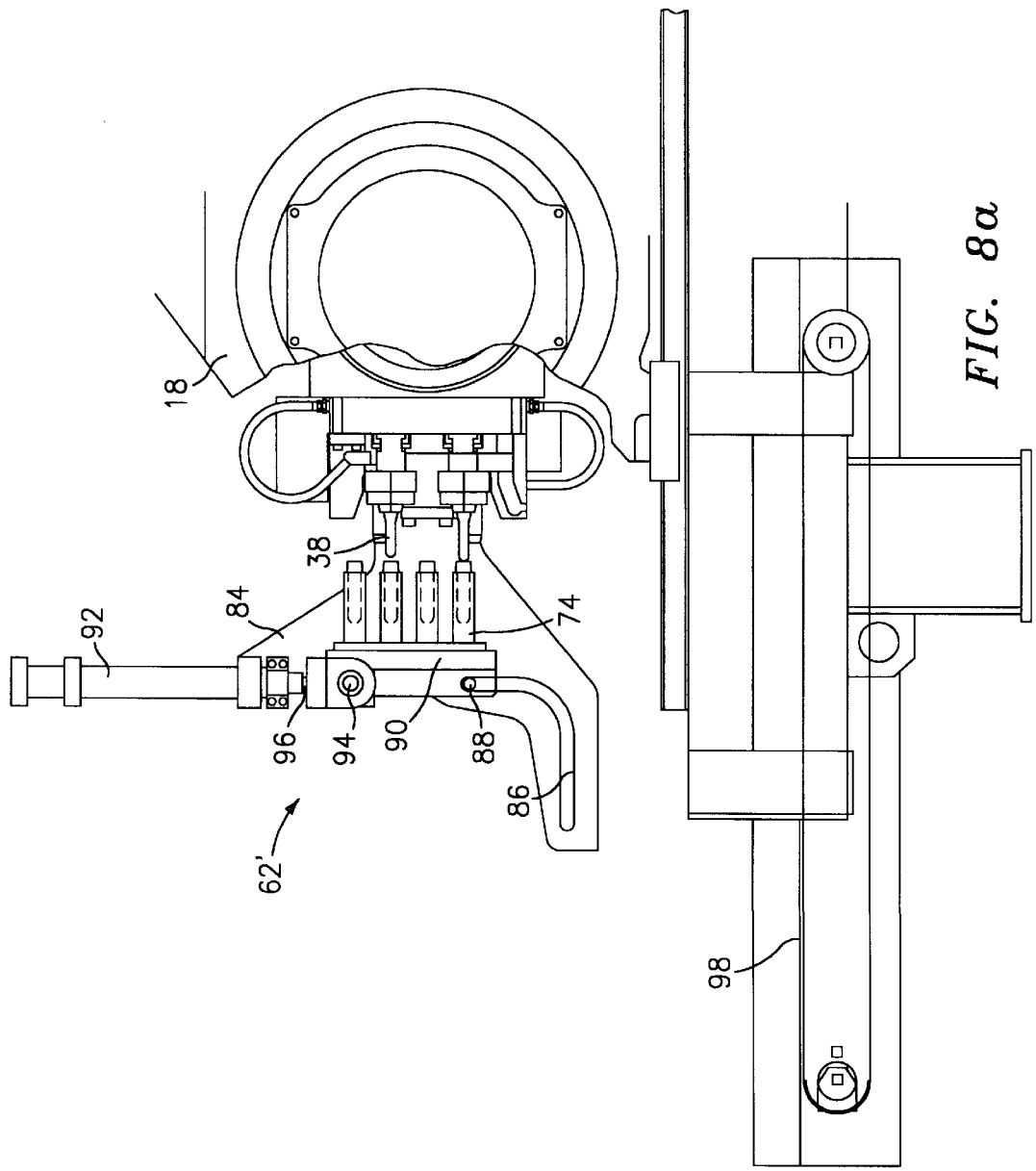

COOLING DEVICE ATTACHED TO AN INDEX MACHINE

CROSS REFERENCE TO RELATED APPLICATION(S)

The present application is a continuation-in-part application of U.S. patent application Ser. No. 09/167,699, filed Oct. 7, 1998, now U.S. Pat. No. 6,059,557 entitled COOLING DEVICE ATTACHED TO INDEX MACHINE, By Ronald Ing et al.

BACKGROUND OF THE INVENTION

The present invention relates to a device for cooling and removing molded parts, which device has particular utility with a two faced index molding machine.

Index molding machines are known in the art. U.S. Pat. No. 5,728,409, assigned to the assignee of the instant application, shows a four faced turret block with a temperature conditioning station mounted to the turret for directing cooling air onto newly molded articles and a tubular part removal system using an air conveyor. Currently, there is a need for a lower cost molding machine which employs only a two faced turret block and correspondingly half the number of core sets of tooling.

Co-pending, allowed U.S. patent application Ser. No. 08/847,895 to Arnott et al., now U.S. Pat. No. 5,837,501 entitled Injection Molding Machine Having a High Speed Turret, filed Apr. 28, 1997, also assigned to the assignee of the instant application, shows an index molding machine with a two faced turret block. This application however does not discuss the problems of part cooling and controlled part removal.

Co-pending U.S. patent application Ser. No. 09/070,598, to Gait et al., filed Apr. 30, 1998, entitled Tiebar Structure for Injection Molding Machine, also assigned to the assignee of the instant application, shows a two tiebar index molding machine. Here again, there is no discussion of part cooling or part removal.

U.S. Pat. No. 4,729,732 and U.S. Reissue Pat. No. 33,237, both assigned to the assignee of the instant application, show a multi-position tooling plate with water cooled tubes used to remove and cool preforms from a conventional preform molding machine. The tooling plate design shown in these patents has two disadvantages. First, the robot mechanism occupies a substantial floor area adjacent the machine. Second, the preforms are cooled inside their tubes in a horizontal orientation. This has been found to be detrimental in that the weight of the preform causes it to press more firmly against the lower portion of the cooling tube while its upper surface tends to separate from the upper portion of the cooling tube. This unequal contact force with the cooling surface tends to promote unequal cooling of the preform from one side to the other. A vertical orientation during cooling provides a symmetrical weight distribution with a balanced heat removal result.

Conventional index molding machines eject parts at the lowermost station, i.e., when the molded parts to be ejected are under the turret block. There is a need to accommodate part ejection/removal at a station opposite to the molding station to permit two faced turret operation in a molding cycle where the turret rotates 180 degrees each time the mold opens instead of rotating 90 degrees at each mold opening.

SUMMARY OF THE INVENTION

Accordingly, it is an object of the present invention to provide a device which has improved molded part cooling and improved molded part removal.

It is a further object of the present invention to provide a device as above which allows cooling of the molded part or parts in a vertical orientation.

It is a further object of the present invention to provide a device as above which has particular utility in a two faced turret molding machine.

The foregoing objects are achieved by the device of the present invention.

In accordance with the present invention, a device for cooling and removing molded parts from a rotary turret block mounted within a support structure and having one of at least one mold core and at least one mold cavity on each of at least two faces is described. The device broadly comprises a carrier plate, means for receiving and cooling at least one molded part mounted to a first surface of said carrier plate, means for applying a cooling fluid to external surfaces of the at least one molded part while the at least one molded part is positioned on one of the faces of the rotary turret block, which cooling fluid applying means is mounted on a second surface of the carrier plate, and means for moving the carrier plate between a first position where the receiving and cooling means is aligned with the at least one molded part and a second position where the at least one molded part is being cooled within the receiving and cooling means and the cooling fluid applying means is positioned adjacent a respective turret block face. The moving means comprises a cam plate having a guide track therein, at least one cam follower connected to the carrier plate, and drive means for causing the cam follower to move along the guide track. In certain embodiments of the present invention, the cam plate comprises either a rotating cam plate or a sliding cam plate for providing an additional movement which allows the means for applying cooling fluid to move towards and away from molded parts on a respective face of the rotary turret block to be cooled. In another embodiment, the moving means includes two cam followers engageable and disengageable with the guide track for providing this additional forward movement. In still another embodiment, the cam plate has first and second plate members which can be shifted relative to a support for the device so as to provide the additional forward movement for the means for applying cooling fluid to the molded part(s).

Other details of the device of the present invention, as well as other objects and advantages attendant thereto, are set forth in the following detailed description and the accompanying drawings wherein like reference numbers depict like elements.

BRIEF DESCRIPTION OF THE DRAWINGS

FIG. 1b is an end view of the molding machine of FIG. 1a;

FIG. 3 is a partial sectional view of the molding machine of FIG. 1a;

FIG. 4 is a partial sectional view of the molding machine of FIG. 1a;

FIG. 7 is a chart showing the sequence of operation of the molding machine of FIG. 1a;

FIGS. 8a and 8b illustrate an alternative embodiment of a cooling device having multi-position cooling tubes for use with an index molding machine;

FIGS. 11–14 illustrate another alternative actuation system for the cooling device of FIG. 2a;

DETAILED DESCRIPTION OF THE PREFERRED EMBODIMENT(S)

Figure 1A:
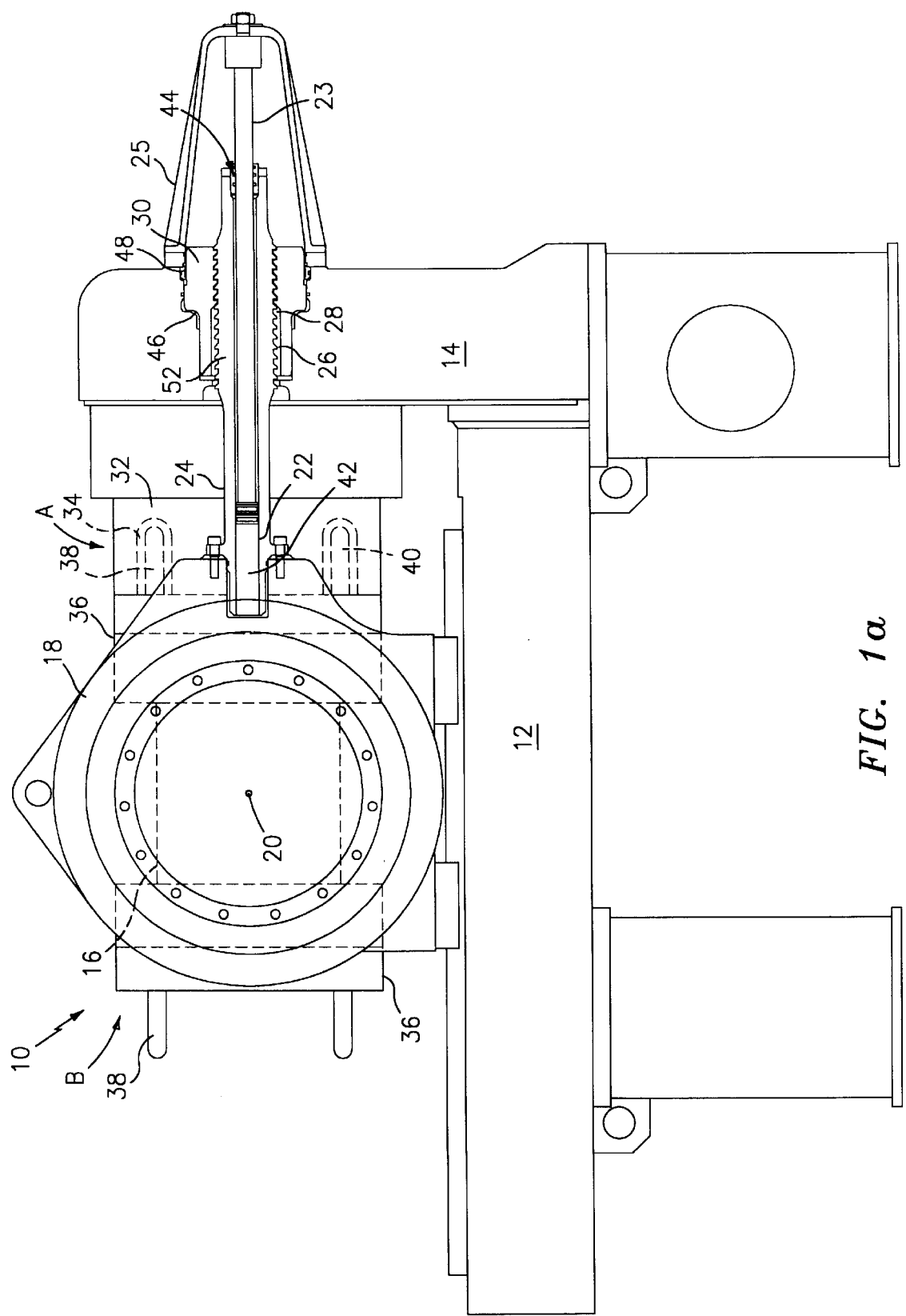
FIG. 1a is a side view of a two tiebar index molding machine.
Figure 1B:
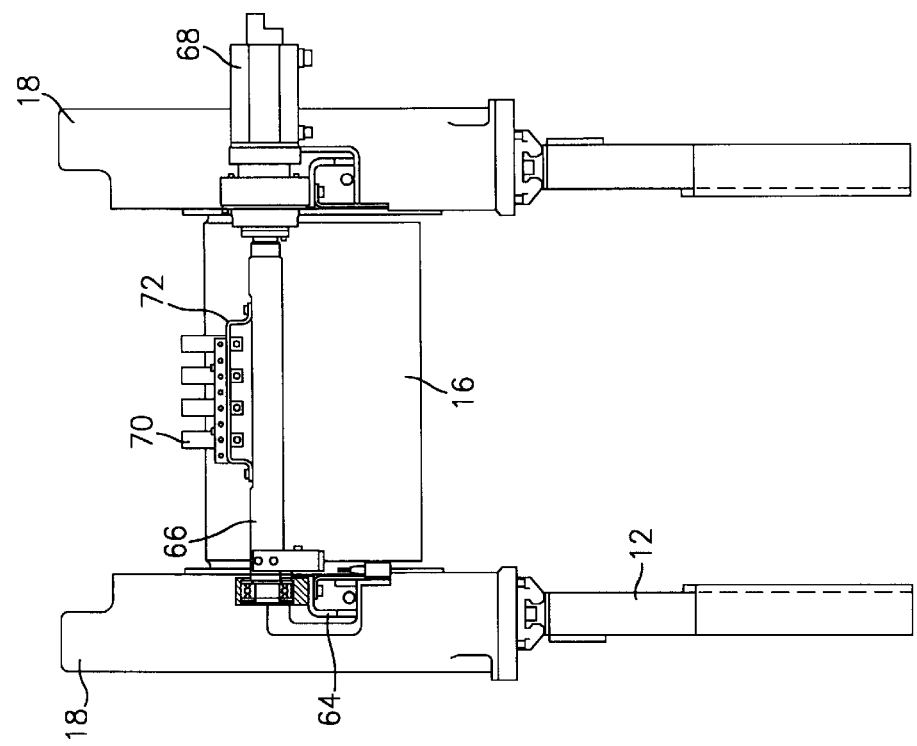

Referring now to the drawings, FIGS. 1a and 1b illustrate a two tiebar index molding machine 10 of the type shown in co-pending U.S. patent application No. 09/070,598, to Galt et al., entitled Tiebar Structure for Injection Molding Machine, filed Apr. 30, 1998, which is incorporated by reference herein. The index molding machine 10 includes a base 12, a fixed platen 14, and a turret block 16 which is movable with respect to the fixed platen 14. The turret block 16 is a two-faced rotary turret block, which is positioned within the movable platen, with pinions in bearings mounted in carriers 18 that slide on the base 12. The turret block 16 is rotated or indexed on a central axis 20 so that the faces thereof represent two positions in an injection molding cycle. Thus, the rotatable turret block 16 is rotatable on a central axis of rotation 20 for rotating a plurality of movable mold halves 36 attached thereto into alignment with a first mold half 32 carried by the fixed platen 14. Each movable mold half 36 includes at least one mold core 38 and is matable with the first mold half 32 for forming a mold for forming at least one molded article, with the mold halves being clamped together as will be described hereinafter.

The first mold half 32 may be joined to the fixed platen 14 in any suitable manner known in the art and may contain one or more mold cavities 34 which together with the mold core(s) 38 form one or more mold cavity spaces 40. Parts 50, such as preforms, are molded by injecting plastic material through the mold half 32 from an injection unit (not shown) into the cavity space(s) 40 formed by the closed mold.

Two tiebars 24 are provided and bolted to the carriers 18, each of which includes an inside stroke cylinder 22, the rod 23 of which is fixed to housing 25 which in turn is bolted to fixed platen 14. Each tiebar 24 includes external teeth 26 of a rotating clamp piston 30 with the clamp piston contained in fixed platen 14. The clamp piston 30 includes a row of teeth 28 and an adjacent row free from teeth so that on rotation of the clamp piston, the clamp piston teeth 28 alternately engage and disengage the tiebar teeth 26. Clamp piston 30 may be rotated by any desired and convenient means (not shown), such as a cylinder means acting on a pin via a slot in housing 25, such as a cylinder bolted to the fixed platen 14 with linkage means connecting the pins together and causing rotation of the pistons 30.

In operation, a pin (not shown) rotates clamp piston 30 so that clamp piston teeth 28 are disengaged from teeth 26 on tiebars 24. High pressure oil is then supplied to the piston end 42 of stroke cylinder 22 via a line (not shown) causing stroke cylinder rod 23 to extend and move carriers 18 and turret block 16 away from the fixed platen 14, thereby opening the mold. In order to close the mold, oil is supplied to the rod side 44 of stroke cylinder 22 via a line (not shown), thereby retracting stroke cylinder rod 23 and closing the clamp until the mold is closed. The aforementioned pin (not shown) is then activated by a cylinder (not shown) and linkage means (not shown) to engage clamp piston teeth 28 with tiebar teeth 26. High pressure oil is then provided to the clamp piston cylinder 46 causing the clamp pistons to clamp the mold. After molding, high pressure oil is provided to the mold break cylinder 48 causing clamp piston 30 to act on the back side of tiebar teeth 26 and urge the mold open. After a short stroke, clamp piston 30 is de-energized and the pin actuated by the aforementioned cylinder and linkage means causes the clamp piston to rotate to disengage clamp piston teeth 28 from tiebar teeth 26 so that stroke cylinder 22 can open the mold.

As shown in FIG. 1a, the turret block 16 has two faces, each with a mold core plate 36 mounted to it. Each mold core plate 36 may be mounted to a respective face of the turret block 16 using any suitable conventional means known in the art. In a preferred embodiment, each mold core plate 36 has a plurality of core pins 38, equal in number to the number of mold cavities 34 in the first mold half 32. As can be seen in FIG. 1a, a first set A of core pins 38 is aligned with the mold cavities 34 in a molding position, while a second set B of core pins 38 are in a cooling position located 180 degrees from the molding position.

After plastic material has been injected into the mold cavity spaces 40 and the molded parts 50 have been formed, the parts 50 are partially cooled in a customary manner by cooling circuits (not shown), such as water cooling circuits, in the mold cavity plate 32 and in the core pins 38. After partial cooling has occurred and the parts 50 have been sufficiently solidified to avoid part deformation, the mold is opened in the manner previously discussed and the molded parts 50 on the first set A of core pins 38 are withdrawn from the mold cavities 34. The turret block 16 is then rotated 180 degrees to present the second set B of core pins 38 for molding while the first set A of core pins 38, complete with the molded parts 50 thereon, are presented at the opposite side of the turret block for further cooling.

In accordance with a first embodiment of the present invention, a device 62 is provided to cool the molded parts and remove them from the core pins 38 when the molded parts are in the cooling position. The device 62 includes a frame 64 attached to the carrier 18 or its support. A cross beam 66 is attached to the frame 64 so as to be capable of rotation through a 90 degree angle. The end of the cross beam 66 remote from the frame 64 is connected to a drive means 68 for rotating the cross beam 66 through said 90 degree rotation. The drive means 68 may comprise any suitable drive means known in the art.

Figure 2A:
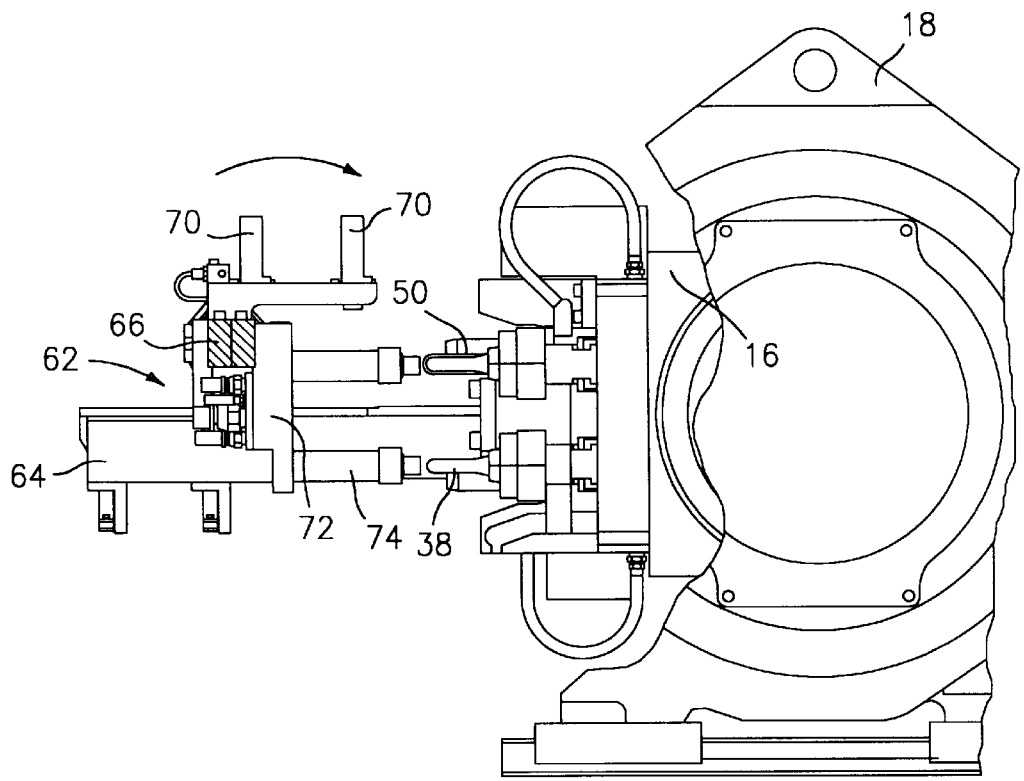
FIG. 2a is a side view of a first embodiment of a cooling device in accordance with the present invention.
Figure 2B:
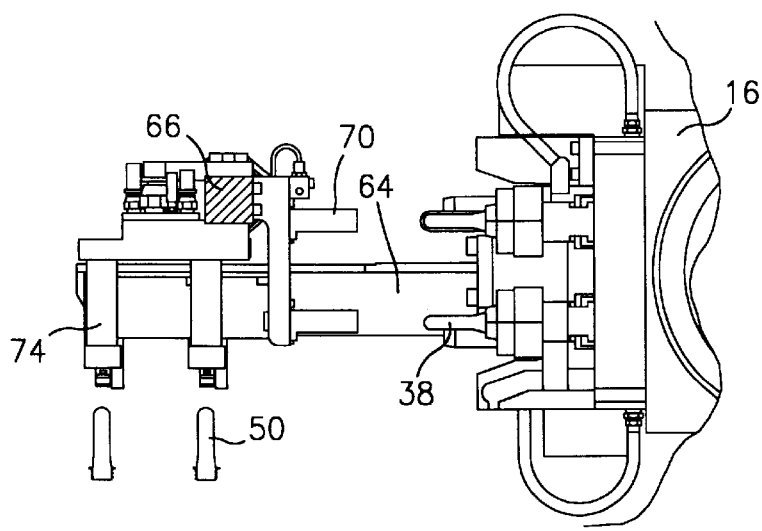
FIG. 2b is a side view of the cooling device of FIG. 2a showing the cooling tubes in a part removing position.

A set of blowing tubes 70 is mounted to a first surface of a head or carrier plate 72 attached to the cross beam 66. The blowing tubes 70 are used to direct a cooling fluid, typically air, toward an end of the molded parts 50, while the parts 50 are on the core pins 38. This blowing position is shown in FIG. 2b. Cooling fluid may be supplied to the blowing tubes 70 in suitable manner known in the art.

A set of cooling tubes 74 is mounted to a second surface of the head 72. As can be seen from FIG. 2a, the cooling tubes 74 are offset 90 degrees from the blowing tubes 70. The set of cooling tubes 74 are used to facilitate removal of the molded parts 50 from the core pins 38. The cooing tubes 74 assist the removal of the molded parts 50 through the application of a vacuum inside the tubes 74 in a known fashion. For example, a port (not shown) in the bottom of each tube 74 may be connected to a vacuum source (not shown). The tubes 74 may be cooled by a fluid, such as chilled water, and remove heat from the parts 50 positioned therein either by convection or conduction. For example, cooling may be achieved by intimate contact between exterior surface of the part and the inside surface of the tube as taught by U.S. Pat. No. 4,729,732, which is incorporated by reference herein.

Figure 3:
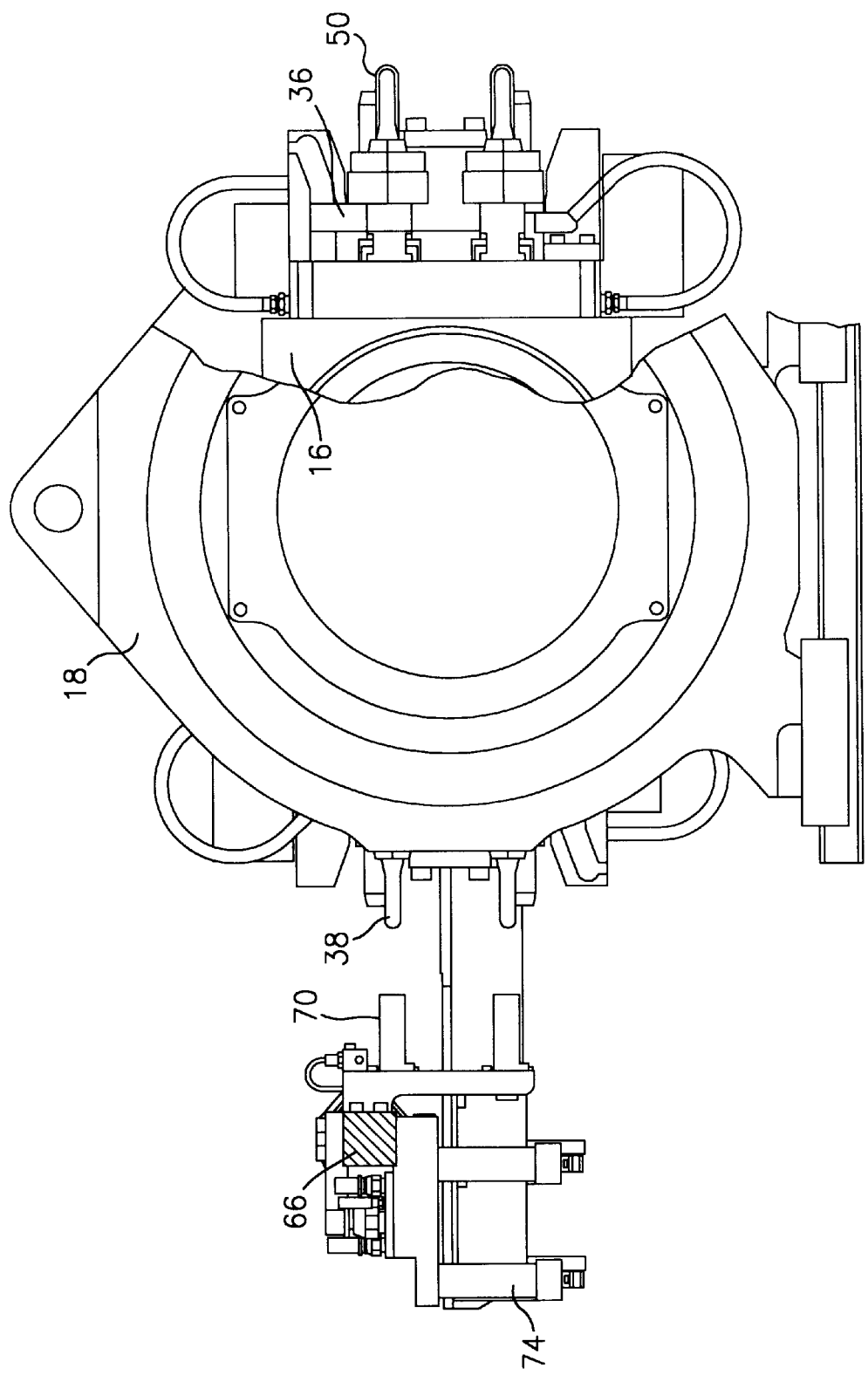
Figure 4:
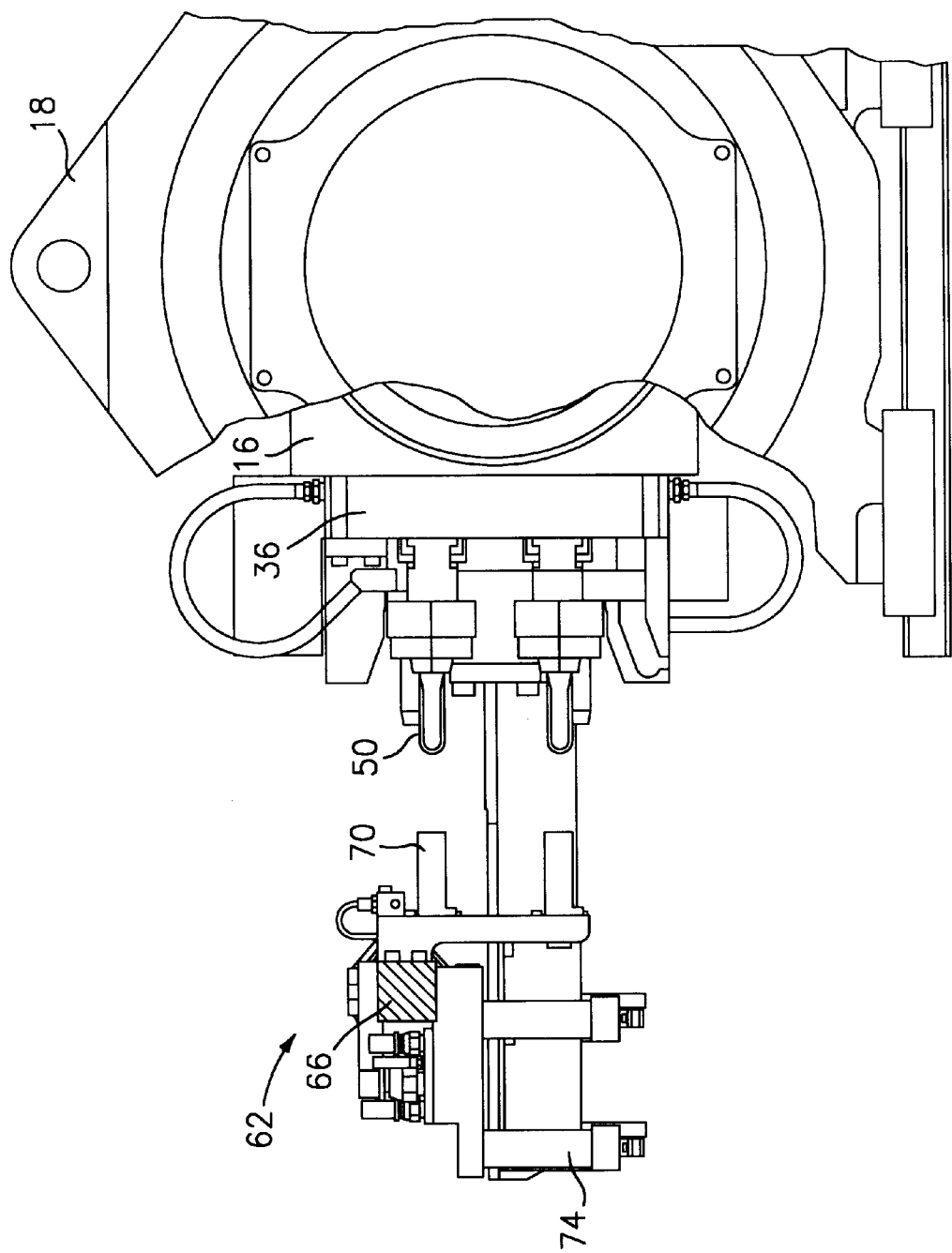
Figure 5:
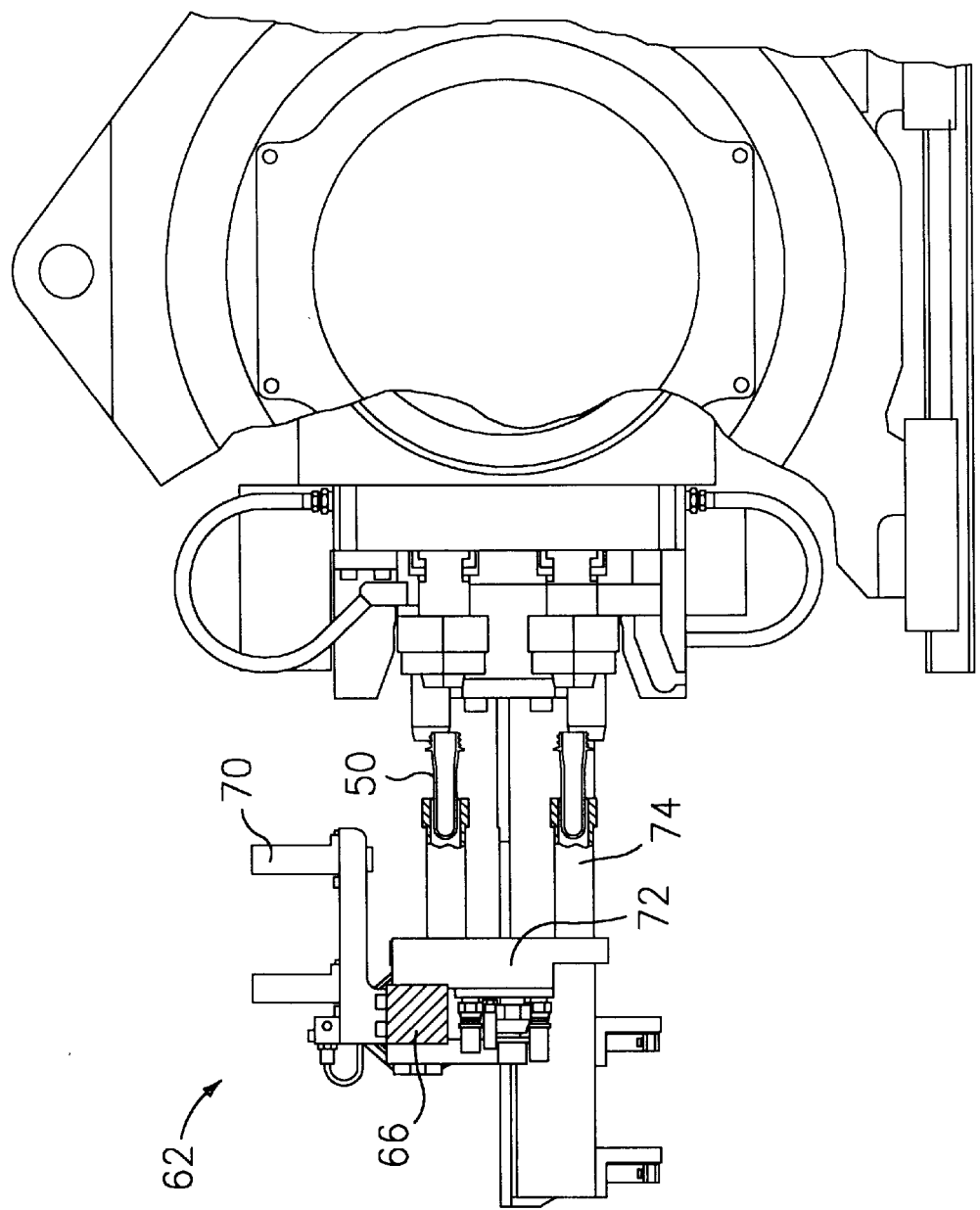
FIG. 5 is a partial sectional view of the molding machine of FIG. 1a in a part transferring mode.
Figure 6:
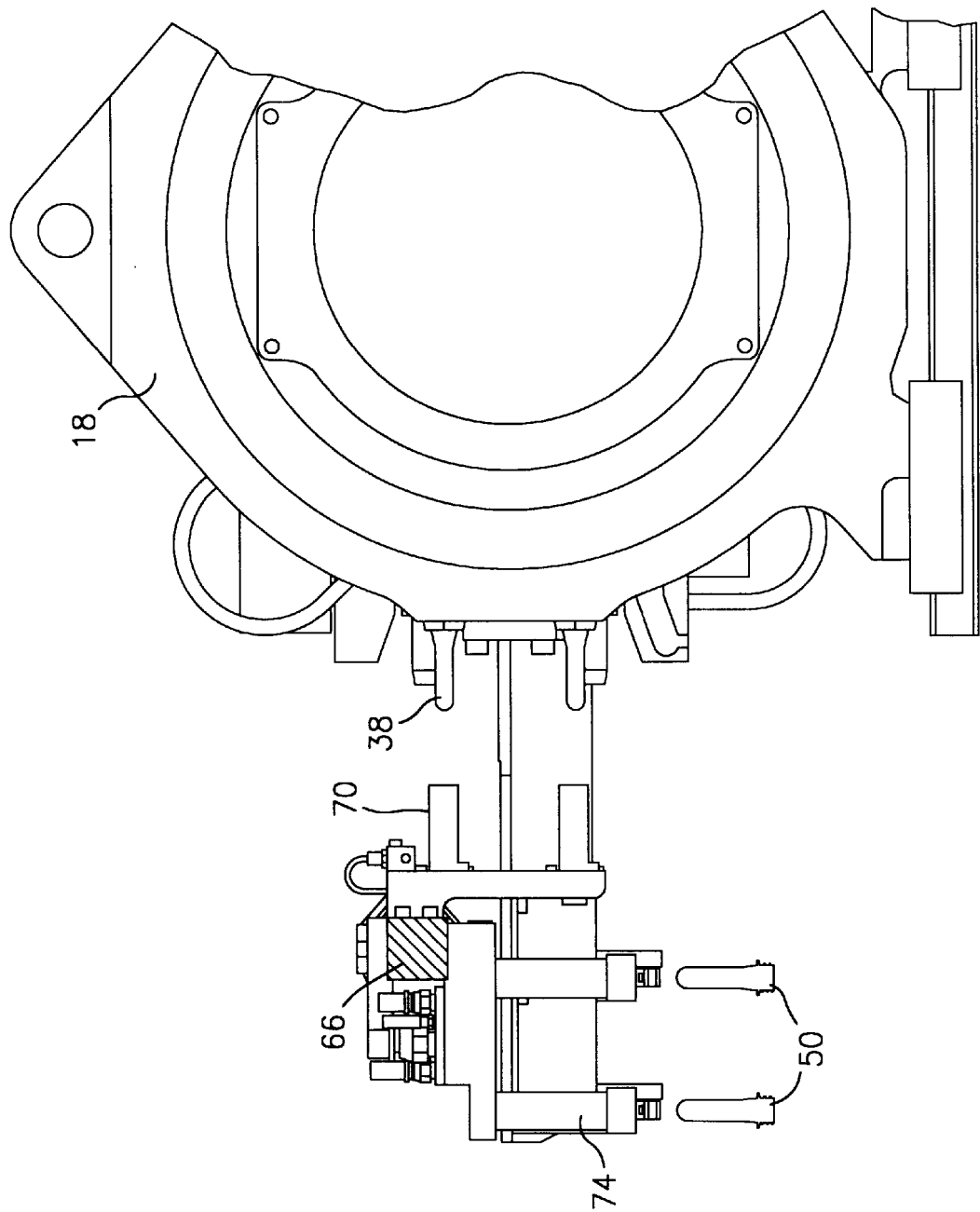
FIG. 6 is a partial sectional view of the molding machine of FIG. 1a with the cooling device ejecting cooled molded parts.

FIG. 3–6 illustrate the sequence of operation of a molding machine in accordance with the present invention. FIG. 3 shows the clamp closed and the parts 50 being molded on the first core set A. FIG. 4 shows the clamp closed for molding on the second core set B while cooling air is being directed from tubes 70 onto the ends of the molded parts 50 on the first core set A. FIG. 5 shows the cross beam 66 rotated 90 degrees to align the cooling tubes 74 with the parts 50 on the first core set A as the parts are ejected into the tubes 74. Ejection of the molded parts 50 from the core pins 38 into tubes 74 is carried out by the provision of ejection means, such as ejection pins/sleeves or an ejection plate, on each mold face 36. FIG. 6 shows cross beam 66 rotated 90 degrees in the reverse direction to once again align the blowing tubes 70 with the next set of molded parts while the previous set of parts are ejected from cooling tubes 74. Ejection of the cooled parts 50 from the cooling tubes 74 may be effected by discontinuing the vacuum and allowing gravity to cause the parts to drop out of the tubes 74 or by blowing the parts 50 out of the tubes 74 or by mechanical ejection means such as those shown in U.S. Pat. No. 5,447,426, which is incorporated by reference herein.

Figure 7:
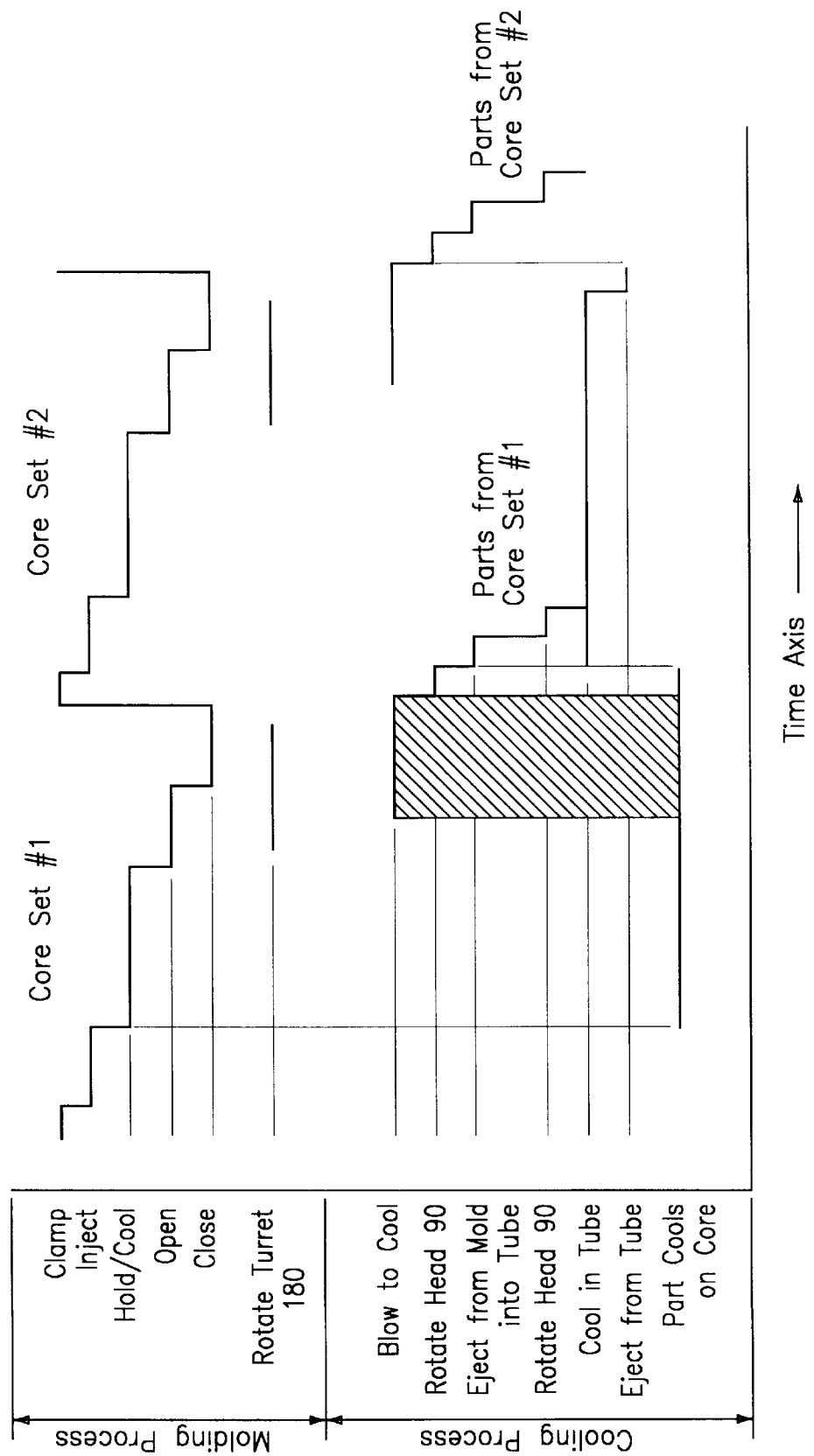

FIG. 7 shows the sequence of operation for making the molded parts 50. The top half of the chart shows the molding process and indicates two identical sequences spaced in time, the first for the first core set A, and the second for the second core set B. Each of the sequences starts with the mold closed, as shown in FIG. 1a. The injection molding sequence of clamp, inject, hold/cool, and open then follows. During the mold opening stroke, the index turret block 16 simultaneously begins to rotate 180 degrees to align the second core set for molding while the first core set, with the molded parts 50 on the core pins 38, is aligned to the cooling and removal device 62. The rotation is completed during the closing stroke of the turret block 16.

The bottom half of the chart shows the cooling process and indicates a sequence that overlaps the two molding processes shown in the top half of the chart. The ejection and cooling sequence begins as the first core set A with molded parts 50 thereon is aligned to the cooling and removal device 62. Cooling fluid, typically compressed air, is blown from tubes 70 directly onto the ends of the molded parts 50, as they remain cooling on the core pins 38. Thus, during this portion of the sequence, parts 50 are cooled both internally and externally. Then the head 72 is rotated 90 degrees to align the cooling tubes 74 with the molded parts 50 on the core pins 38. Next the ejection system of the mold in combination with the vacuum circuit in the cooling tubes 74 transfers the parts from the core pins 38 to the tubes 74 wherein the parts are immediately cooled on their outer surfaces by their contact with the water cooled tubes, in a known fashion. The device 62 is immediately rotated again so that the tubes 74 point downward and the molded parts 50 continue cooling in a vertical orientation to ensure symmetrical cooling and gravitational effects maintaining a distortion-free part. The molded parts 50 are held in the tubes 74 by the applied vacuum and continue to cool until just before it is time to rotate the device 62 back to receive the next set of molded parts from the second core set B. Thus, the cooling time for the complete process optimizes the time the molded parts 50 are cooled, first while in the mold and on the cores and secondly while in the cooling tubes 74. Additional cooling is provided by the air blowing from tubes 70 onto the parts 50 during the shaded portion shown on the chart.

By maximizing the cooling time of the molded parts 50 as described hereinabove, it has been found that only two core sets are required for an optimum molding cycle. Thus the tooling cost for equipping a four faced turret block can be significantly reduced by using only a two faced turret block. The cost of the core sets is halved.

As can be seen from the foregoing discussion, there has been provided in accordance with the present invention a lightweight cooling and part removal device mounted on the moving index carrier that first cools the outside of the part 50 by blowing air and subsequently continues to cool the part 50 inside a cooled tube 74 that also removes the part 50 from the mold. Still further, cooling of the part 50 is performed in a vertical orientation inside a cooled tube 74. As a result, the part 50 has improved properties which are beneficial. Using the device of the present invention, time in this vertical orientation is optimized.

Figure 2C:
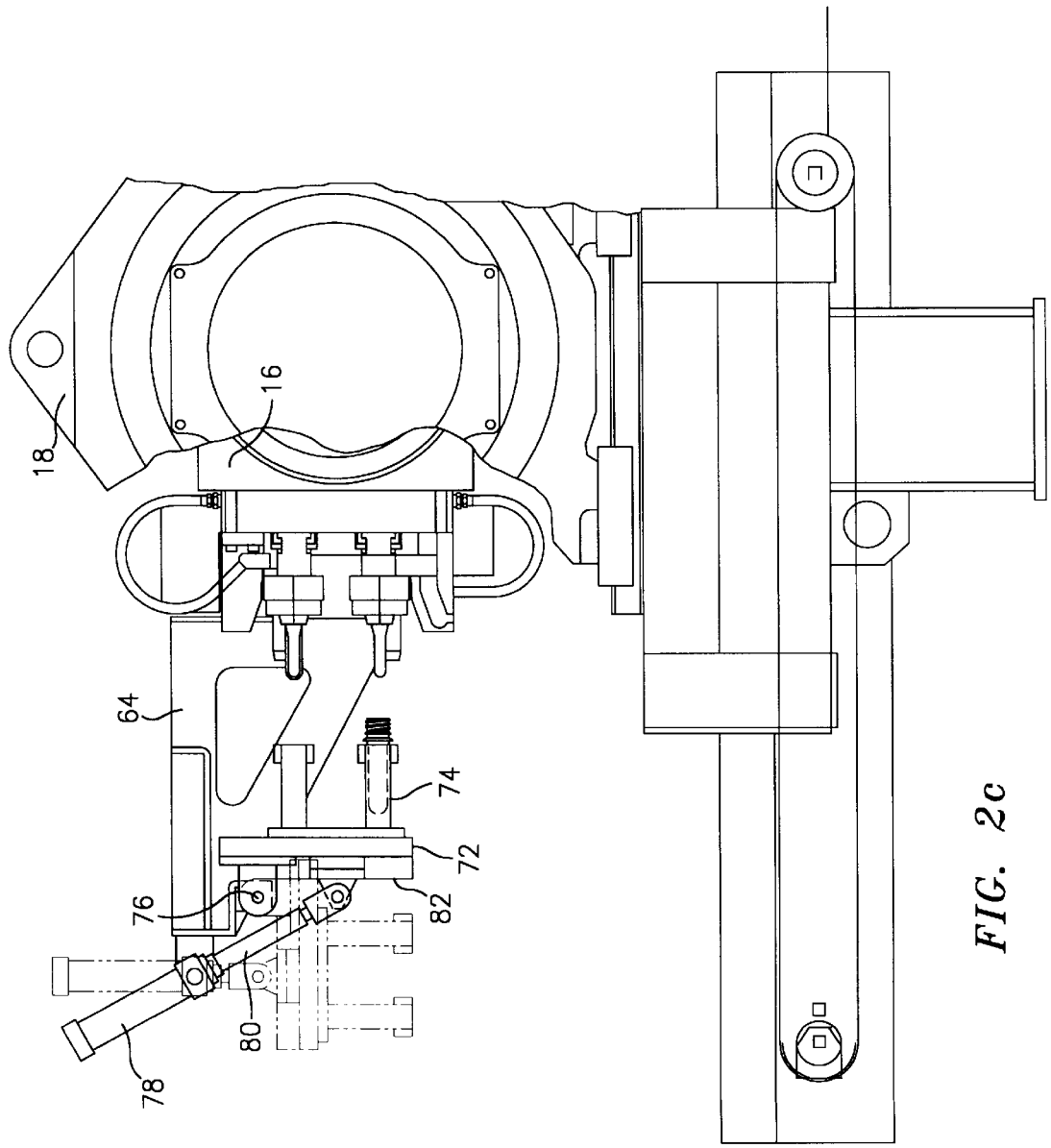
FIG. 2c illustrates an alternative actuation system for moving the cooling device of FIG. 2a between positions.

Referring now to FIG. 2c, an alternative mechanism can be used to rotate a head 72 containing only cooling tubes 72. As shown in this figure, the head 72 may be attached to a frame 64 mounted to one of the carriers 18 by pin connection 76. Further, a piston-cylinder type of actuation unit 78 may be connected to the frame 64. The arm 80 of the actuation unit may be connected to a rear portion 82 of the head 72. As shown in FIG. 2c, the cooling tubes 74 are aligned with core pins 38 and are removing molded articles therefrom. To rotate the head 72 and move the cooling tubes 74 to a vertical orientation, the actuation unit 78 retracts arm 80 and assumes the substantially vertical position shown in dotted lines in the figure.

Referring now to FIGS. 8a and 8b, a second embodiment of the cooling device of the present invention is illustrated. In this embodiment, blowing tubes 70 have been omitted. Instead, the cooling device 62' has additional cooling tubes 74 so that multiposition cooling can be effected in a manner similar to that illustrated in U.S. Reissue Pat. No. 33,237, which is incorporated by reference herein.

As shown in FIG. 8a, the device 62' is mounted in position III on the index machine turret carriage 18. The device 62' has a single side frame 84 mounted to one of the carriers 18 which contains a cam track profile 86. The profile 86 is followed by a cam follower 88 mounted to a movable carrier plate 90 on which are mounted multiple cooling tubes 74. In a preferred embodiment, the number of cooling tubes 74 on the carrier plate 90 is twice the number of core pins 38 on each face of the turret block 16. By providing this number of cooling tubes 74, the molded parts can be held within the cooling tubes 74 for successive molding cycles, thus extending the cooling times which can be achieved.

An actuator 92 is mounted to the side frame 84 and has a journaled connection 94 with the carrier plate 90 such that when the actuator's rod 96 is extended the carrier plate 90, following the cam track profile 86, is first translated to move the carrier plate 90 in a vertical direction and then moved from the vertical plane orientation shown in FIG. 8a to the horizontal plane orientation shown in FIG. 8b. During translation, a first set of cooling tubes 74 holding molded parts is moved out of alignment with the core pins 38 and a fresh set of cooling tubes 74 is presented to receive the next set of molded parts. When the carrier plate 90 is in the position shown in FIG. 8b, the parts 50 can be cooled in a vertical orientation and ejected when ready onto the conveyor 98 below. The actuator 92 may comprise any suitable actuator known in the art such as piston-cylinder unit.

Figure 9A:
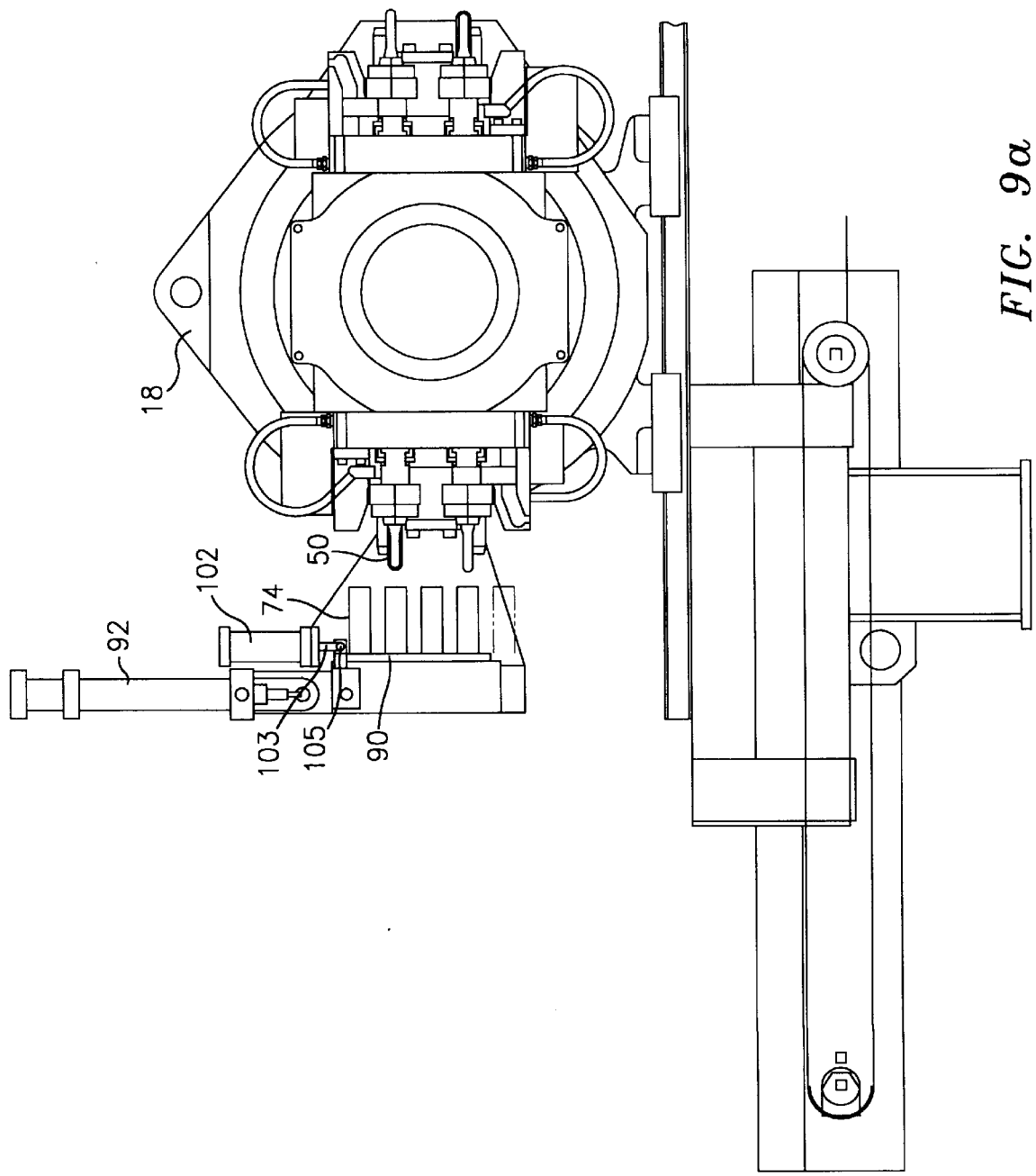
FIGS. 9a–9c illustrate an alternative actuation system for the cooling device of FIGS. 8a and 8b.
Figure 9C:
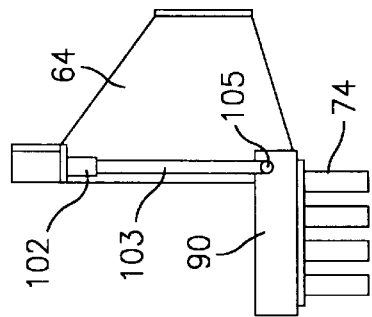
Figure 9B:
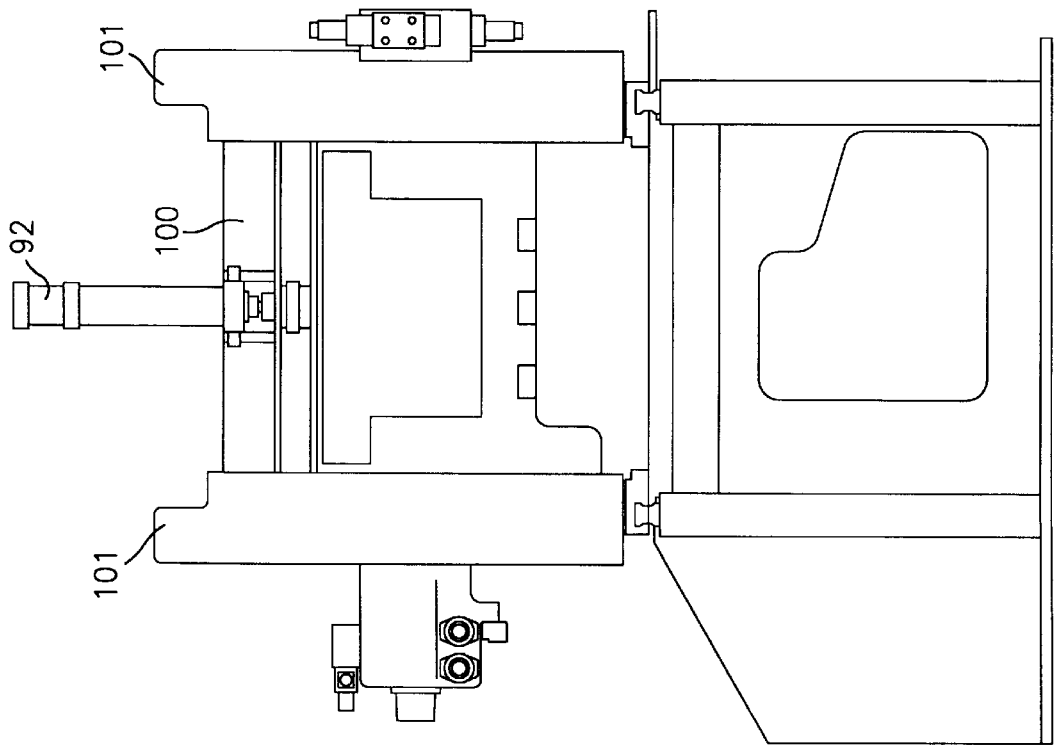

FIGS. 9a–9c illustrate an alternative actuation system for moving the cooling device 62' of FIG. 8a so that the carrier plate 90 moves from a vertical orientation to a horizontal orientation. In this embodiment, the actuator 92 is centrally mounted on a bridge 100 connecting support frames 101 on both sides of the machine 10. The actuator 92, in this arrangement, only effects the vertical positioning of the carrier plate 90. To effect rotation of the carrier plate 90 from the vertical position to the horizontal position shown in FIG. 9c, a separate actuator 102, preferably in the form of a piston-cylinder unit, is provided. The actuator 102 moves vertically with the carrier plate and when it reaches the end of its vertical travel, the actuator arm 103 is moved to rotate the carrier plate 90 about the pivot point 105 so that the parts 50 in the cooling tubes 74 is vertically oriented.

Figure 10B:
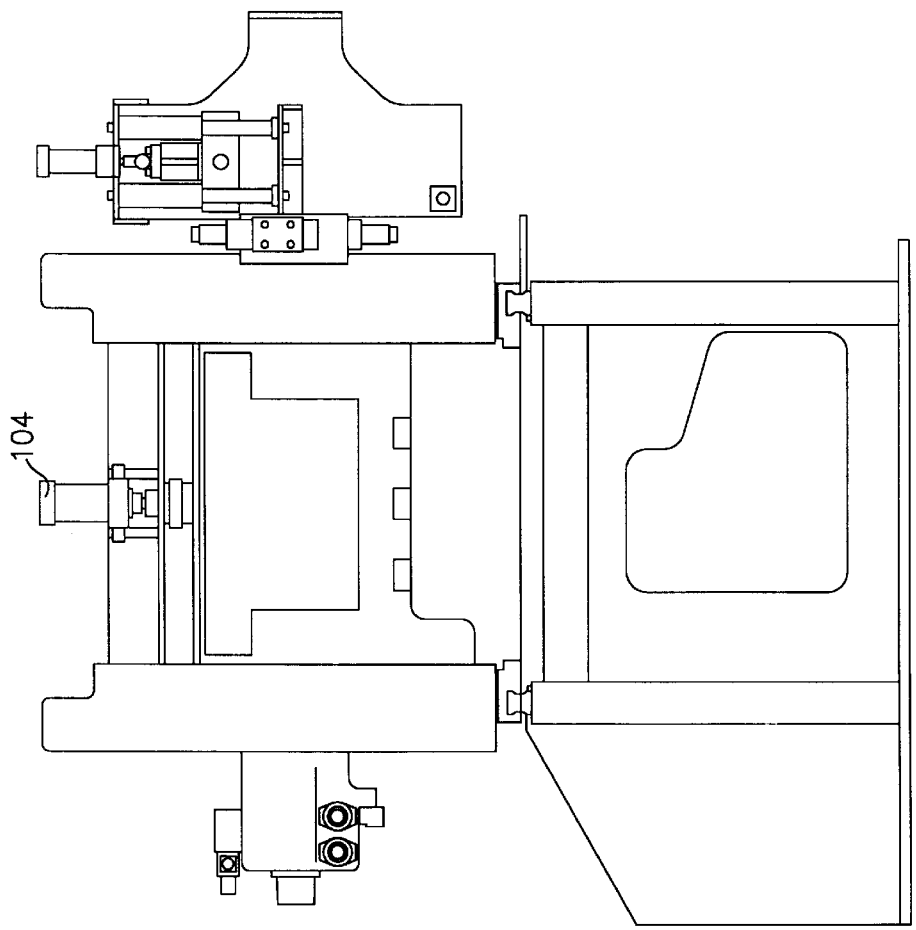
FIGS. 10a and 10b illustrate another alternative actuation system for the cooling device of FIGS. 8a and 8b.
Figure 10A:
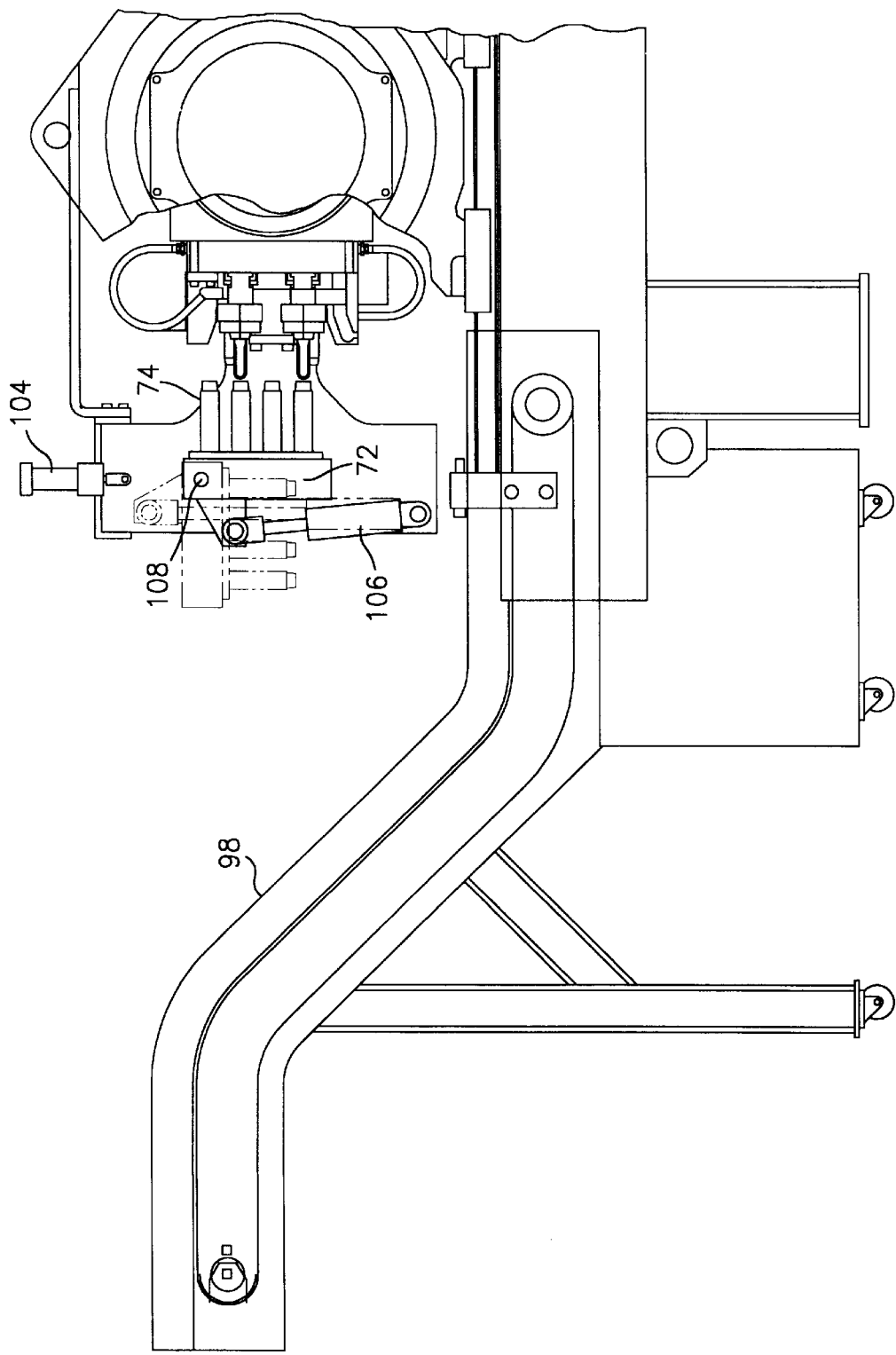

FIGS. 10a and 10b illustrate yet another embodiment of an actuation system for the cooling device 62'. In this arrangement, two cylinders 104 and 106 are used to translate and rotate the carrier plate. As shown in the figure, the carrier plate 72 containing the cooling tubes 74 is pivotally connected at pivot 108 to the frame 64 which is connected to a support structure on the machine 10. The actuator or cylinder 104 may be attached to carrier plate 72 in any suitable manner known in the art and is used to translate the carrier plate 72 with tubes 74 in a vertical direction. This translation may be carried out in any suitable manner known in the art. The actuator or cylinder 106 is connected to the carrier plate 72 and is used to rotate the carrier plate 72 about pivot point 108 so that tubes 74 assume a vertical orientation.

As can be seen from the foregoing discussion, there has been provided in the embodiments of FIGS. 8–10, a lightweight, multi-position cooling carrier plate arrangement for attachment to an index carrier that removes parts horizontally from the mold and cools and ejects them in a vertical orientation, while extending cooling time with multiple tubes.

Referring now to FIGS. 11–14, another system 300 is illustrated for moving the device 62 for cooling the molded parts 50 and removing them from the core pins 38. The system 300 includes a cam plate 302 having a guide track 303 and a cam follower 304 pivotally connected to a bracket 305 attached to the carrier plate 72. The cam plate 302 may be connected to a support 306 for the device 62, which support 306 may be connected to the molding machine. If desired, the cam plate 302 may be omitted and the guide track 303 may form part of the support 306.

The system further includes a linear drive system 308 having a track 312 and a member 310 movable along the track 312. The track 312 is preferably secured to the support 306. The system 308 further includes an actuator 309, such as an electric motor or piston-cylinder type actuator, for moving the member 310 along the track 312. The movable member 310 is pivotally connected to the carrier plate 72 using any suitable means known in the art.

Figure 11:
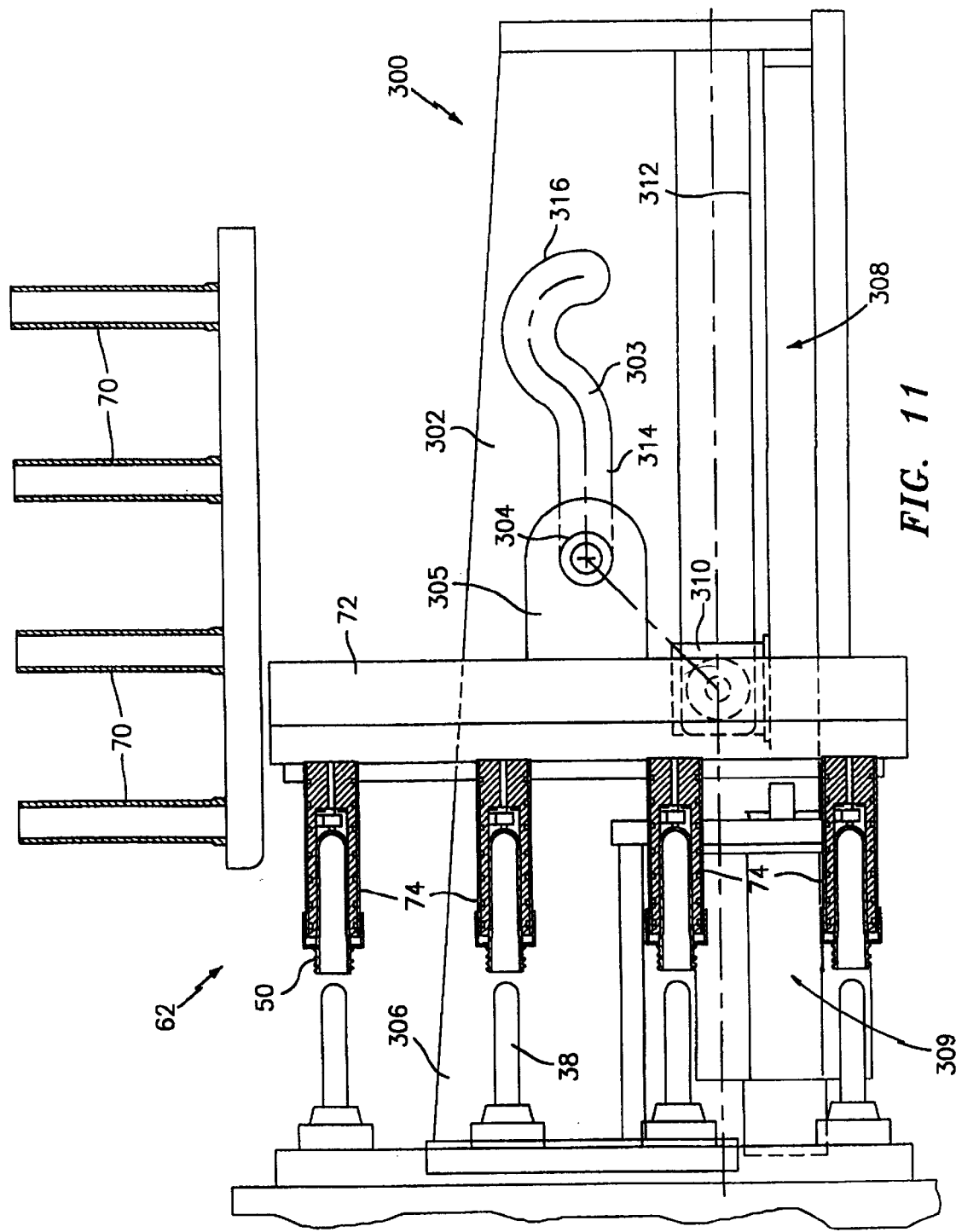
Figure 12:
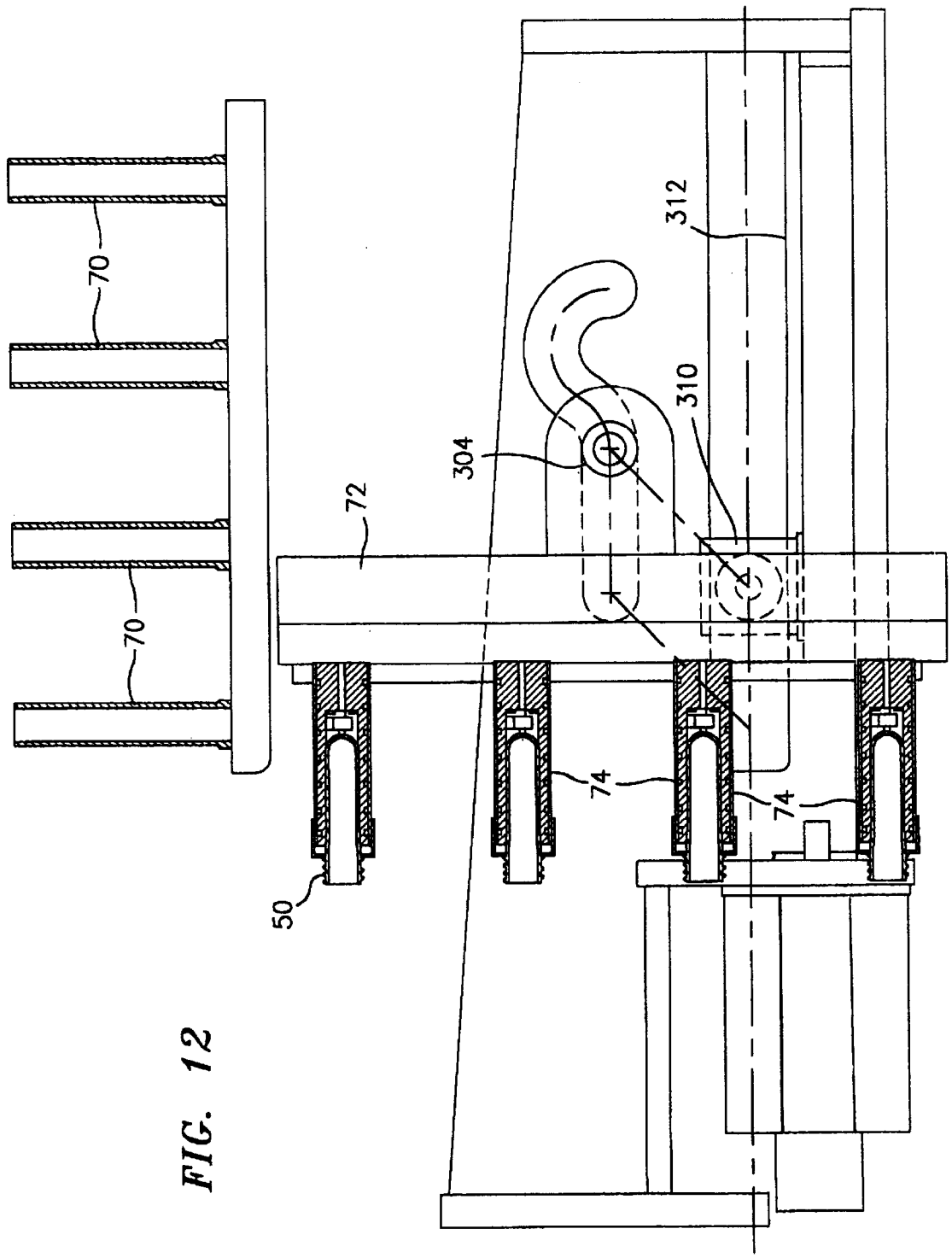

The operation of the drive system 300 can be seen from FIGS. 11–14. The guide track 303 preferably includes a first linear portion 314 and a second arcuate portion 316. As shown in FIG. 11, the cam follower 304 is located at one end of the linear portion 314. In this position, the cooling tubes 74 are positioned adjacent the core pins 38 on a respective face of the rotary turret block so as to receive the molded parts 50. After the parts 50 have been received in the cooling tubes 74, the linear drive system 308 is actuated to move the member 310 along the track 312 and to cause the cam follower 304 to move to a second end of the linear portion 314. In this position (FIG. 12), the cooling tubes 74 have been drawn back from the core pins 38 and the carrier plate 72 has been moved in a position to be rotated.

Figure 13:
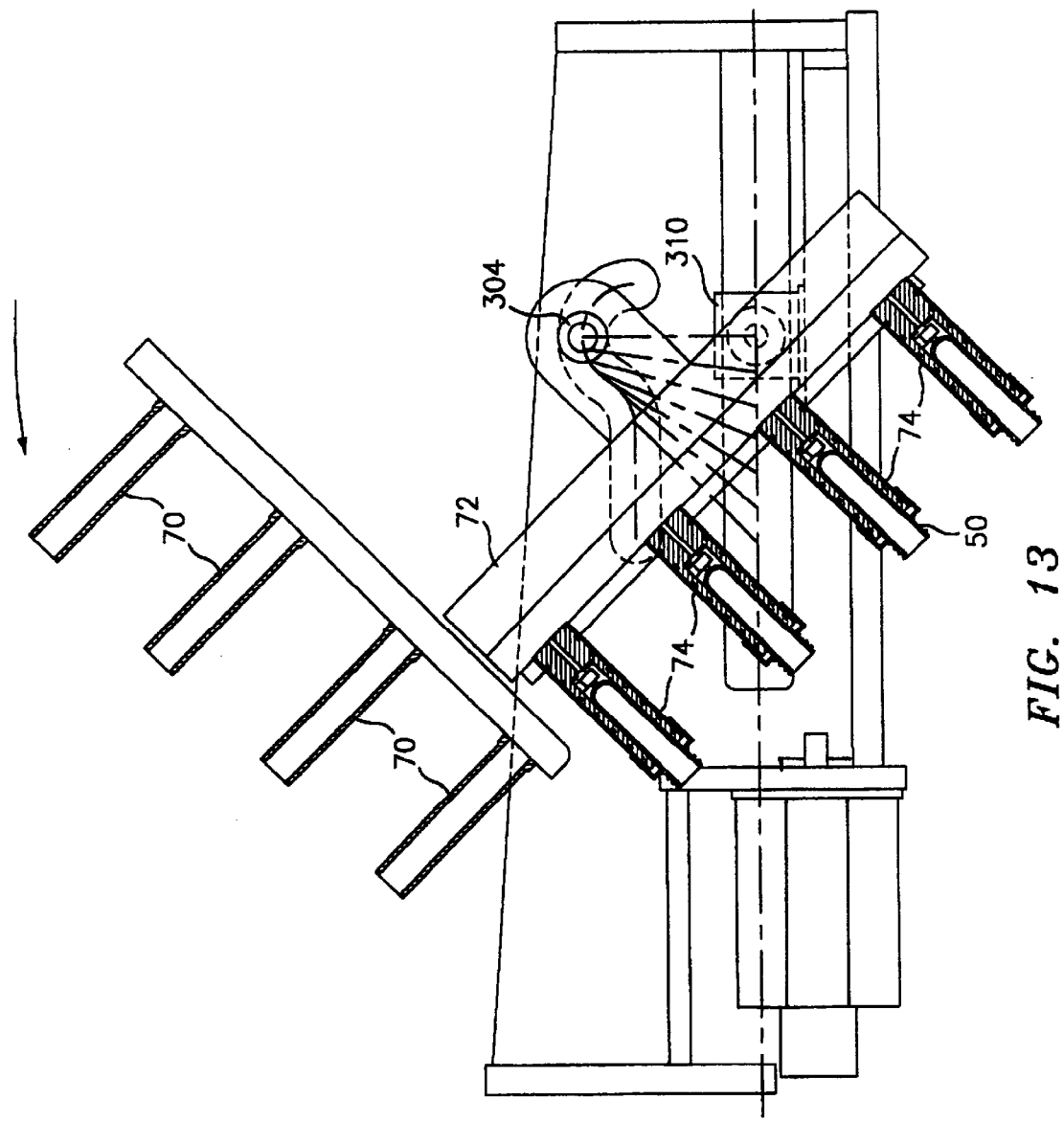
Figure 14:
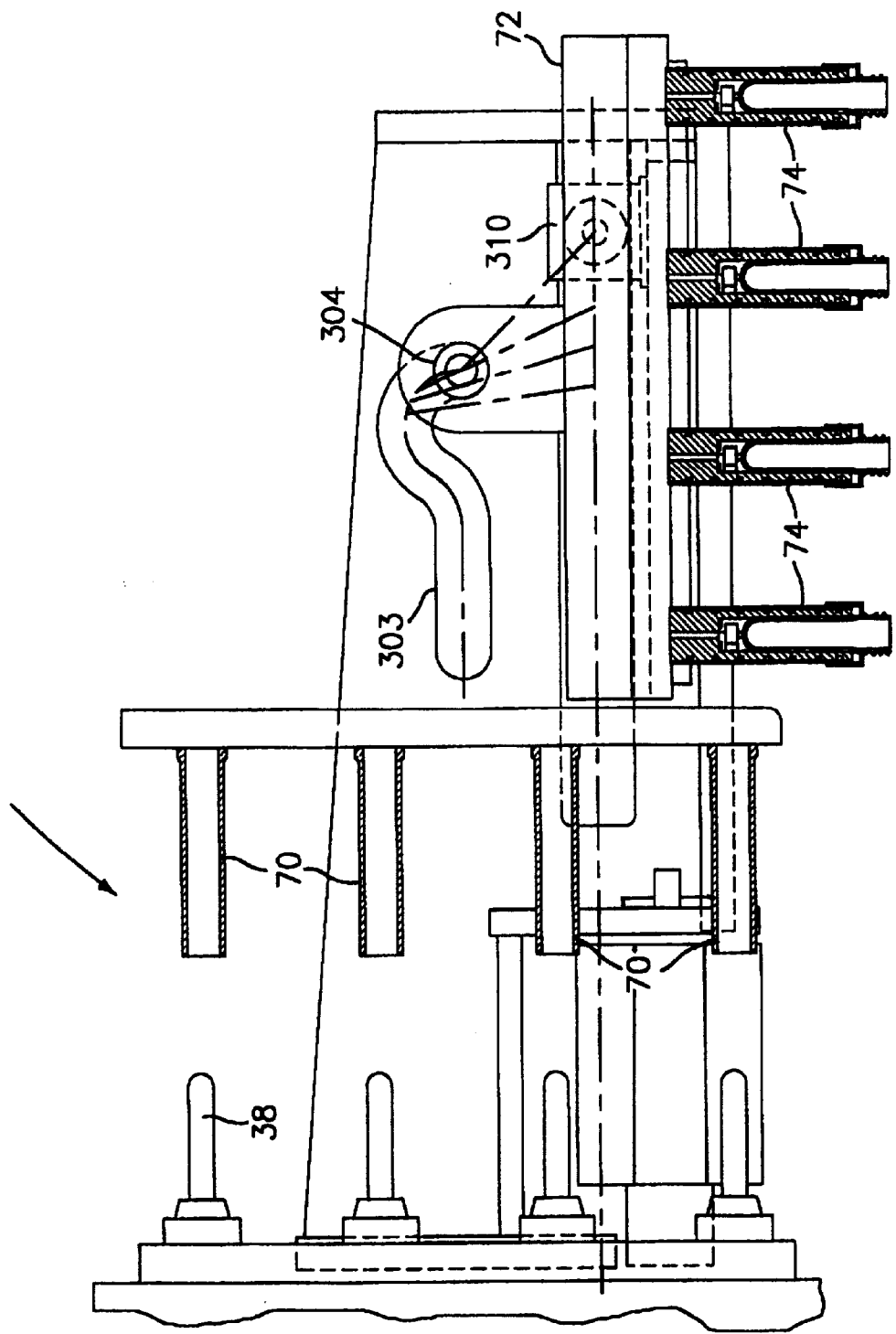

The drive system 308 is then actuated to cause the movable member 310 to move further along the track 312 and the cam follower 304 to move through the arcuate portion 316. As shown in FIGS. 13 and 14, this movement causes the carrier plate 72 to rotate about its pivotal connections with the member 310 and the cam follower 304 from a first position where the cooling tubes 74 are aligned with the respective face of the turret block to a second position where the cooling tubes 74 point downwardly and the molded parts 50 being cooled are in a substantially vertical orientation. The rotation of the carrier plate 72 in this manner causes the blowing tubes 70 to be brought into a position where they can apply a cooling fluid to the next set of molded parts 50. When it is desired to return the cooling tubes 74 from the second position to the first position so as to receive the next set of molded parts, operation of the linear drive system 308 is reversed.

Figure 15C:
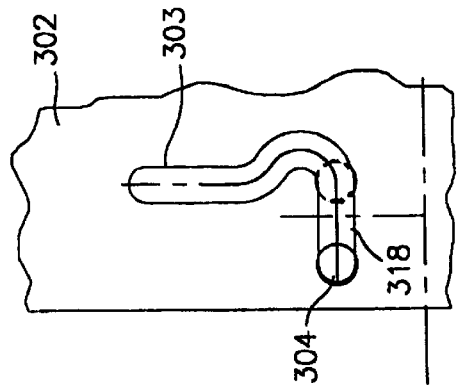
FIGS. 15(a)–15(c) illustrate the operation of an alternative actuation system for the cooling device of FIG. 2a which utilizes rotating cam plate.
Figure 15B:
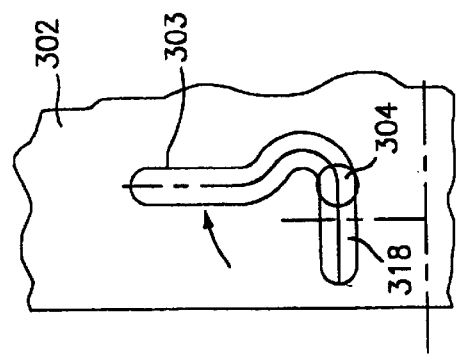
Figure 15A:
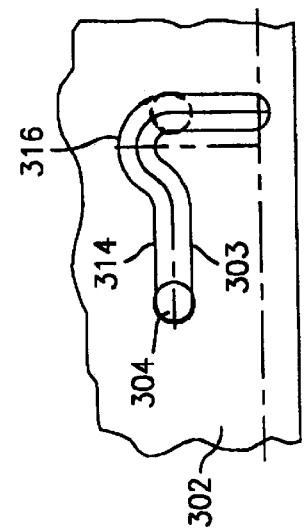

Referring now to FIGS. 15(a)–15(c), if desired, the cam plate 302 can be rotatably connected to the support 306 using any suitable connection means known in the art. In a preferred embodiment, the guide track 303 includes a second linear portion 318 in addition to the first linear portion 314, and the arcuate portion 316. Still further, suitable means (not shown) such as an electric motor or a piston-cylinder type actuator may be provided to rotate the cam plate 302. The cam follower 304 may be connected to the carrier plate 72 in the manner previously discussed and the linear drive system 308 may be used in the manner previously described.

In operation, the carrier plate 72 is caused to move away from the core pins 38 and rotate so that the removed molded parts 50 assume a substantially vertical orientation in the same manner as FIGS. 11–14. After the carrier plate 72 has assumed its second position with the parts in the substantially vertical orientation, the cam plate 320 is rotated 90 degrees relative to the support 306. Thereafter, the linear drive system 308 is operated to cause the cam follower 304 to enter and pass through the second linear portion 318. This causes the blowing tubes 70 to move towards the core pins 38 holding the next set of molded parts 50 to be cooled. To rotate the carrier plate 72 and move the cooling tubes 74 back to a position adjacent the molded parts 50 to be removed, the foregoing operation is reversed.

Figure 16C:
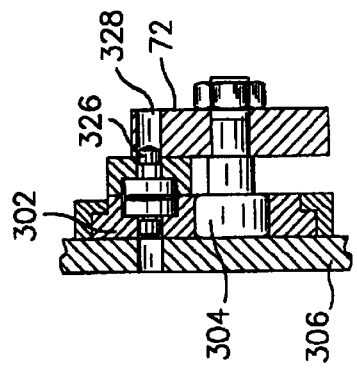
FIGS. 16(a)–16(c) illustrate still another alternative actuation system for the cooling device of FIG. 2a which utilizes sliding cam plate.
Figure 16B:
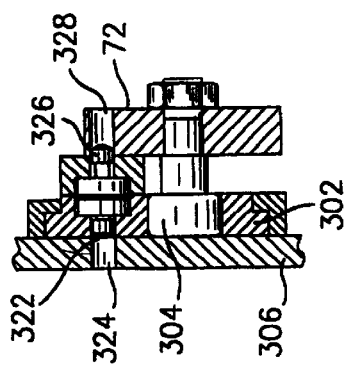
Figure 16A:
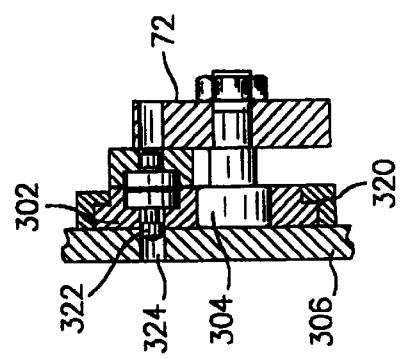
Figure 17A:
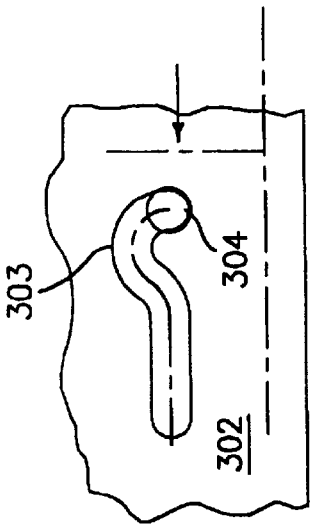
FIGS. 17(a)–17(c) illustrate the movement of the cam follower and cam plate in the system of FIGS. 16(a)–16(c)
Figure 17B:
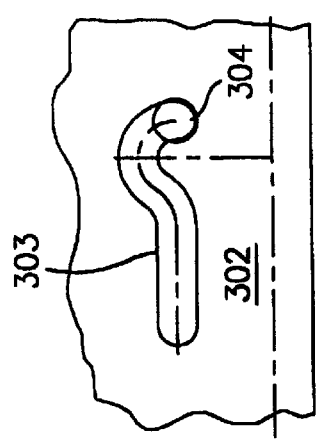
Figure 17C:
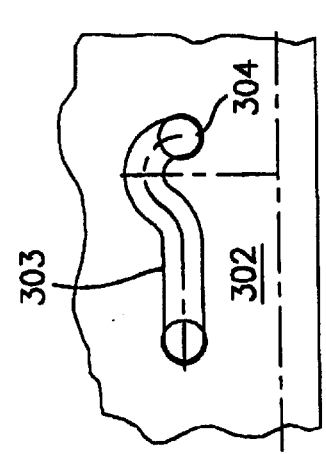

Referring now to FIGS. 16(*a*)–16(*c*) and FIGS. 17(*a*)–17 (*c*), instead of a rotating cam plate, it is also possible to use a sliding cam plate 302 to enable the same operation as in system of FIGS. 15(*a*)–15(*c*). As shown therein, the support 306 may be provided with track means 320 for permitting movement of the cam plate 302 relative to the support 306. When movement between the support 306 and the cam plate 302 is not desired, a pin 326 incorporated into the cam plate 302 is inserted into a receiving bore 324 in the support 306. When movement between the support 306 and the cam plate 302 is desired, the pin 322 is removed from the bore 324. Movement of the pin 322 is accomplished with an actuation device such as an air actuated cylinder (not shown). To allow the cam plate 302 to move forward with the carrier plate 72 as desired, a second pin 326 is incorporated in the cam plate 302 and the carrier plate is provided with a receiving bore 328. Movement of the pin 326 is accomplished with an actuation device such as an air actuated cylinder (not shown).

In operation, the cam plate 302 is locked to the support 306 by engaging the pin 326 with the bore 324 and disengaging the pin 326 from the bore 328. As before, the linear drive system 308 is actuated to first move the carrier plate 72 and the cooling tubes 74 back from a respective face of the turret block and then rotate the carrier plate 72 so that the cooling tubes 74 assume their downward orientation and the blowing tubes 70 are aligned with a respective face of the turret block. Then, the pin 326 is removed from the bore 324 and the pin 326 is brought into engagement with the bore 328. The linear drive system 308 is then actuated to move the carrier plate 72 and the cam plate 302 with respect to the support 306 to move the blowing tubes 70 towards the next set of molded parts 50 to be cooled. To return the cooling tubes 74 to a position adjacent the next set of cooled molded parts 50 to be removed, the foregoing operation is reversed.

Figure 18A:
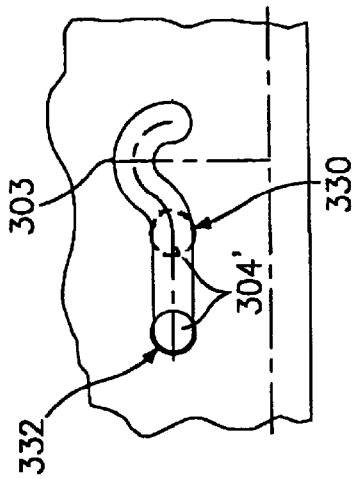
FIGS. 18(a)–18(c) illustrate the operation of an alternative actuation system for the cooling device of FIG. 2a which utilizes two cam followers.
Figure 18B:
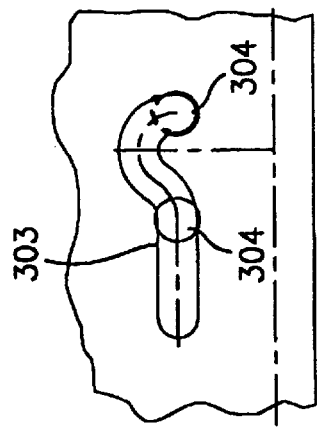
Figure 18C:
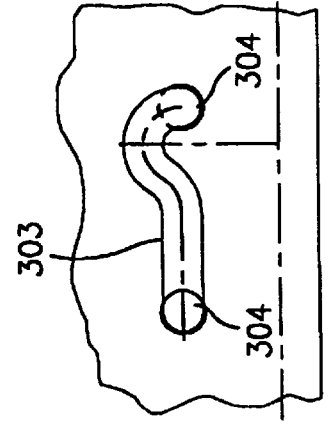

Referring now to FIGS. 18(*a*)–18(*c*), yet another system for rotating the carrier plate 72 between the first and second positions and to move the blowing tubes 70 towards and away from a respective face of the turret block is illustrated. In this embodiment, the carrier plate is provided with two cam followers 304 and 304'. During the first part of the operation where the carrier plate 72 is operated as before to move the cooling tubes 74 back from the face of the turret block and to rotate the cooling tubes 74 to a downward orientation and bring the blowing tubes 70 into alignment with the next set of molded parts to be cooled, the first cam follower 304 is engaged with the guide track 303 and the second cam follower 304' is disengaged from the guide track 303. After the carrier plate 72 has reached its second position, the first cam follower 304 is disengaged from the guide track 303 and the second cam follower 304' is engaged with the guide track 303. As shown in FIG. 18(*c*), the second cam follower initially contacts the guide track 303 at point 330. Operation of the linear drive means 308 causes the cam follower 304' to move forwardly along the linear portion 314 until it reaches the point 332. This causes the blowing tubes 70 to move forward towards the molded parts 50 to be cooled. When it is desired to move the cooling tubes 74 back to a position adjacent the next set of molded parts to be removed and cooled, the foregoing operation is reversed.

The cam followers 304 and 304' are guided in bushings attached to the carrier plate. They are engaged and disengaged by air cylinder.

Figure 19C:
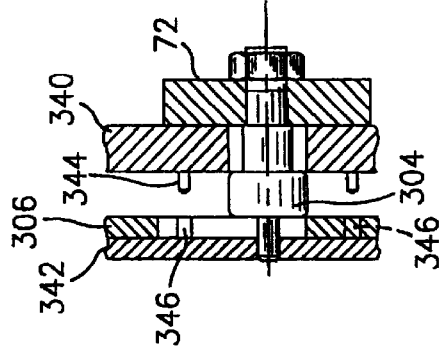
FIGS. 19(a)–19(c) illustrate still another alternative actuation system in the cooling device of FIG. 2a which utilizes sliding cam box.
Figure 19B:
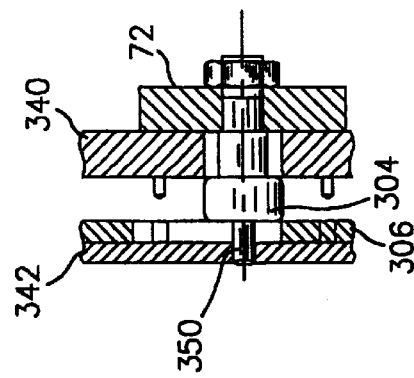
Figure 19A:
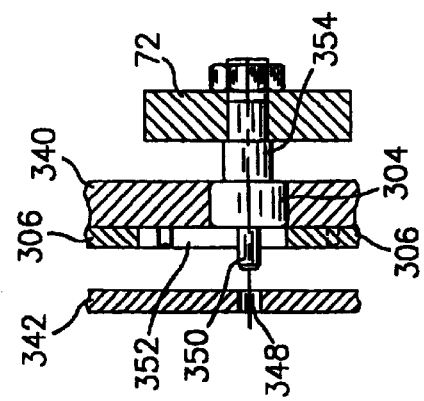

Referring now to the embodiments of FIGS. 19(*a*)–19(*c*) and 20(*a*)–20(*c*), yet another embodiment for rotating the carrier plate 72 between the first and second positions and to move the blowing tubes 70 towards and away from a respective face of the turret block is illustrated. In this embodiment, cam plate 302 comprises a first cam plate member 340 which includes the guide track 303 and a second cam plate member 342, spaced from the first cam plate member. The plates 340 and 342 are connected together. As can be seen from the figures, the support 306 is positioned between the two cam plate members 340 and 342.

Figure 20C:
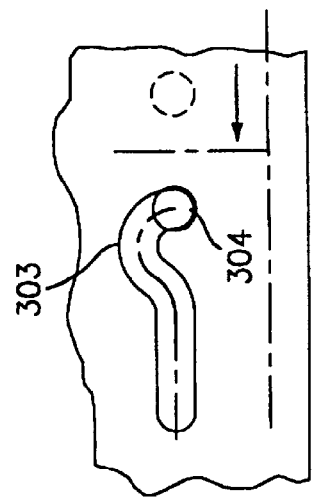
FIGS. 20(a)–20(c) is a schematic representation of the movement of the cam follower and cam box in the system of FIGS. 19(a)–19(c).
Figure 20B:
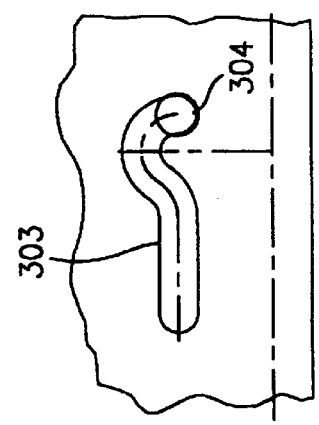
Figure 20A:
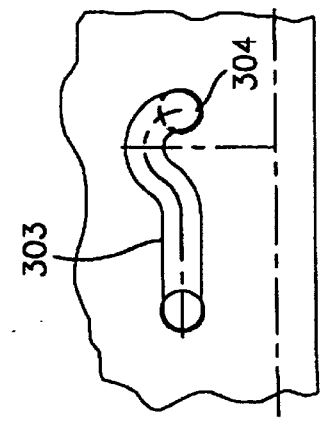

When it is desired to move the carrier plate 72 to move the cooling tubes 74 back from the face of the turret block and to rotate the cooling tubes 74 to a downward orientation and bring the blowing tubes 70 into alignment with the next set of molded parts to be cooled, the first cam plate 340 is locked to the support 306 via one or more pins 344 which are received in one or more bores 346 in the support 306. As shown in FIG. 20 (*a*), the cam follower 304, when the first cam plate 340 is locked to the support 306, is positioned within the guide track 303.

When it is desired to move the blowing tubes 70 toward the next set of molded parts 50 to be cooled, the first cam plate 340 is disengaged from the support 306 and the second cam plate 342 is moved into a position adjacent the support 306. The cam plates 340 and 342, in a preferred embodiment, are moved by an air cylinder-type actuation device (not shown). As can be seen from the figures, the second cam plate 342 has a bore 348 for receiving a pin 350 attached to the cam follower 304. Engagement of the pin 350 in the bore 348 causes the cam follower to be locked to the cam plate 342. As can be seen from FIG. 20(*b*), the cam follower 304 disengages from the guide track 303 when the cam plate 340 is moved away from the support 306, however, it is locked in position vis a vis the track 303 by the shaft portion 354. Thereafter, the linear drive system 308 is actuated to move the cam plates 340 and 342, with the locked in cam follower, towards the next set of molded parts 50 to be cooled by the blowing tubes 70. As can be seen from the figures, the support 306 is provided with a passageway 352 to allow this movement. When it is desired to return the cooling tubes 74 to a position adjacent the molded parts 50, the operation is reversed.

In the foregoing embodiments, the support 306 may be attached to the index molding machine or alternatively may support the device 62 independent of the molding machine so as to enable it to be used with a rotary turret block system which is not part of a molding machine.

While the faces of the turret block have been described as having core pins 38, it should be recognized that the faces could have one or more mold cavities in lieu of said core pins. In such an instance, the first mold half would have one or more mold cores.

It is apparent that there has been provided in accordance with the present invention a cooling device attached to an index machine which fully satisfies the objects, means and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A device for use with a machine having a rotary turret block mounted within a support structure and one of at least one mold core and at least one mold cavity on each of at least two faces of said rotary turret block, said device comprising:

a carrier plate;

means for receiving and cooling at least one molded part, said means for receiving and cooling, mounted to a first surface of said carrier plate;

means for applying a cooling fluid to external surfaces of said at least one molded part while said at least one molded part is positioned on one of said faces of said rotary turret block;

said cooling fluid applying means being mounted to a second surface of said carrier plate; and means for moving said carrier plate between a first position where said receiving and cooling means is aligned with said at least one molded part and a second position where said at least one molded part is being cooled within said receiving and cooling means and said cooling fluid applying means is positioned adjacent a respective turret block face, said moving means comprising a cam plate having a guide track therein, at least one cam follower connected to said carrier plate, and drive means for causing said cam follower to move along said guide track.

2. The device according to claim 1, wherein said drive means comprises linear drive means pivotally connected to said carrier plate to allow said carrier plate to rotate between said first position and said second position.

3. The device according to claim 2, wherein said at least one cam follower is pivotally connected to said carrier plate to permit said carrier plate to rotate between said first position and said second position.

4. The device according to claim 1, wherein said guide track has a linear portion for causing said receiving and cooling means to move towards and away from said respective face of said turret block and an arcuate portion for causing said carrier plate to move between said first and second positions.

5. The device according to claim 4, wherein said cam plate comprises a rotating cam plate.

6. The device according to claim 4, wherein said cam track includes a third portion for allowing said cooling fluid applying means to move toward and away from said respective face of said turret block.

7. The device according to claim 1, further comprising first and second cam followers attached to said carrier plate, said first cam follower being engageable with said guide track for moving said receiving and cooling means from said first position to said second position and said second cam follower being engageable with said guide track for moving said cooling fluid applying means towards and away from said respective face of said turret block.

8. The device according to claim 7, further comprising said second cam follower being disengaged from said guide track when said first cam follower is engaged with said guide track and said first cam follower being disengaged from said guide track when said second cam follower is engaged with said guide track.

9. The device according to claim 1, further comprising:

means for supporting said device; and said cam plate being slidably supported by said device supporting means.

10. The device according to claim 9, further comprising:

said device support means including track means; and said cam plate being slidably movable within said track means.

11. The device according to claim 9, further comprising first means for selectively securing said cam plate to said device support means and second means for selectively securing said cam plate to said carrier plate.

12. The device according to claim 11, wherein when said cam plate is secured to said device support means said carrier plate moves between said first position and said second position and vice versa and wherein when said cam plate is secured to said carrier plate said cooling fluid applying means moves towards and away from said respective face of said turret block .

13. The device according to claim 11, wherein said means for selectively securing said cam plate to said support means comprises a first pin and means for receiving said first pin in said support means and said means for selectively securing said cam plate to said carrier plate comprises a second pin and means for receiving said second pin in said carrier plate.

14. The device according to claim 1, further comprising:

support means for said device; and said cam plate comprising a first cam plate member including said guide track and a second cam plate member spaced from said first cam plate member; and means for moving said first cam plate member into and out of engagement with said support means, whereby when said first cam plate member is in engagement with said support means said carrier plate can move between said first and second positions and vice versa and when said first cam plate is out of engagement with said support means said cam plates can move relative to said support means and thereby move said cooling fluid applying means relative to said respective face of said turret block.

15. The device according to claim 14, wherein said first cam plate has pin means for securing said first cam plate to said support means.

16. The device according to claim 14, wherein when said first cam plate is out of engagement with said support means said at least one cam follower is disengaged from said guide track in said first cam plate.

17. The device according to claim 16, further comprising said at least one cam follower having a pin adjacent an end thereof and said second cam plate member has a bore for receiving said at least one cam follower pin when said first cam plate is out of engagement with said support means and locking said at least one cam follower to said support means.

18. An injection molding machine which comprises:

a first platen carrying a first mold half having one of at least one mold core and at least one mold cavity;

a second platen in association with said first platen, said second platen comprising turret block means rotatable on a central axis of rotation for rotating at least two movable mold halves into alignment with the first mold half;

each of said movable mold halves having one of at least one mold core and at least one cavity and being movable between a first molding position where it is aligned with said first mold half and a second cooling position where it is not aligned with said first mold half;

means for sequentially moving said movable mold halves into contact with said first mold half and to form respective sets of at least one molded part; and a device for cooling said sets of molded parts and removing said molded parts from said movable mold halves, said device comprising a carrier plate, means applying a cooling fluid to external surfaces of said at least one molded part forming one of said sets when one of said movable mold halves is in said second cooling position, means for receiving and further cooling said at least one molded part forming said one of said sets, said receiving and further cooling means being mounted to a first surface of said carrier plate, said cooling fluid applying means mounted to a second surface of said carrier plate, and means for moving said carrier plate between a first position where said receiving and further cooling means is aligned with said at least one molded part forming said one of said sets and a second position where said at least one molded part forming said one of said sets is being cooled within said receiving and cooling means and said cooling fluid applying means is positioned adjacent a next one of said sets, said carrier plate moving means comprising a cam plate having a guide track therein, at least one cam follower connected to said carrier plate, and drive means for causing said cam follower to move along said guide track.

19. The machine according to claim 18, wherein said sequential moving means comprises:

means for moving said rotatable turret block means to bring a first one of said movable mold halves into a mold closed position;

means for moving said rotatable turret block means and said first one of said movable mold halves to a mold open position where said at least one molded part forming a first one of said set resides on said first one of said movable mold halves; and means for rotating said rotatable turret block means to cause said first one of said movable mold halves to rotate from said mold open position to said second cooling position and to cause a second one of said movable mold halves to move to said first molding position.

20. The machine according to claim 19, further comprising means for injecting molten material into said at least one mold cavity while a respective one of said movable mold halves is in said mold closed position.

21. The machine according to claim 19, wherein said rotating means causes said rotary turret block means to rotate 180 degrees to move each of said movable mold halves from said first molding position to said second cooling position.

22. The machine according to claim 18, wherein said drive means comprises linear drive means pivotally connected to said carrier plate to allow said carrier plate to rotate between said first position and said second position.

23. The device according to claim 22, wherein said at least one cam follower is pivotally connected to said carrier plate to permit said carrier plate to rotate between said first position and said second position.

24. The device according to claim 18, wherein said guide track has a linear portion for causing said receiving and cooling means to move towards and away from said respective face of said turret block and an arcuate portion for causing said carrier plate to move between said first and second positions.

25. The device according to claim 24, wherein said cam plate comprises a rotating cam plate.

26. The device according to claim 24, wherein said cam track includes a third portion for allowing said cooling fluid applying means to move toward and away from said respective face of said turret block.

27. The device according to claim 18, further comprising first and second cam followers attached to said carrier plate, said first cam follower being engageable with said guide track for moving said receiving and cooling means from said first position to said second position and said second cam follower being engageable with said guide track for moving said cooling fluid applying means towards and away from said respective face of said turret block.

28. The device according to claim 27, further comprising said second cam follower being disengaged from said guide track when said first cam follower is engaged with said guide track and said first cam follower being disengaged from said guide track when said second cam follower is engaged with said guide track.

29. The device according to claim 18, further comprising:

means for supporting said device; and said cam plate being slidably supported by said device supporting means.

30. The device according to claim 29, further comprising:

said device support means including track means; and said cam plate being slidably movable within said track means.

31. The device according to claim 29, further comprising first means for selectively securing said cam plate to said device support means and second means for selectively securing said cam plate to said carrier plate.

32. The device according to claim 31, wherein when said cam plate is secured to said device support means said carrier plate moves between said first position and said second position and vice versa and wherein when said cam plate is secured to said carrier plate said cooling fluid applying means moves towards and away from said respective face of said turret block.

33. The device according to claim 31, wherein said means for selectively securing said cam plate to said support means comprises a first pin and means for receiving said first pin in said support means and said means for selectively securing said cam plate to said carrier plate comprises a second pin and means for receiving said second pin in said carrier plate.

34. The device according to claim 18, further comprising:

support means for said device; and said cam plate comprising a first cam plate member including said guide track and a second cam plate member spaced from said first cam plate member; and means for moving said first cam plate member into and out of engagement with said support means, whereby when said first cam plate member is in engagement with said support means said carrier plate can move between said first and second positions and vice versa and when said first cam plate is out of engagement with said support means said cam plates can move relative to said support means and thereby move said cooling fluid applying means relative to said respective face of said turret block.

35. The device according to claim 34, wherein said first cam plate has pin means for securing said first cam plate to said support means.

36. The device according to claim 34, wherein when said first cam plate is out of engagement with said support means said at least one cam follower is disengaged from said guide track in said first cam plate.

37. The device according to claim 36, further comprising said at least one cam follower having a pin adjacent an end thereof and said second cam plate member has a bore for receiving said at least one cam follower pin when said first cam plate is out of engagement with said support means and locking said at least one cam follower to said support means.

* * * * *